United States Patent
Yamanaka et al.

(10) Patent No.: US 9,768,631 B2
(45) Date of Patent: Sep. 19, 2017

(54) POWER SUPPLY SYSTEM AND VOLTAGE CONTROL METHOD FOR FUEL CELL

(71) Applicant: TOYOTA JIDOSHA KABUSHIKI KAISHA, Toyota-shi, Aichi-ken (JP)

(72) Inventors: Tomio Yamanaka, Nagoya (JP); Mitsuhiro Nada, Toyota (JP); Hiroyuki Suzuki, Ama (JP)

(73) Assignee: Toyota Jidhosha Kabushiki Kaisha, Toyota-shi, Aichi-ken (JP)

( * ) Notice: Subject to any disclaimer, the term of this patent is extended or adjusted under 35 U.S.C. 154(b) by 158 days.

(21) Appl. No.: 14/933,492

(22) Filed: Nov. 5, 2015

(65) Prior Publication Data

US 2016/0141905 A1    May 19, 2016

(30) Foreign Application Priority Data

Nov. 15, 2014  (JP) ................. 2014-232250

(51) Int. Cl.
  *H02J 7/00*  (2006.01)
  *H01M 8/04858*  (2016.01)
  (Continued)

(52) U.S. Cl.
  CPC ......... *H02J 7/0065* (2013.01); *B60L 11/1805* (2013.01); *H01M 8/0488* (2013.01); *H01M 8/04097* (2013.01); *H01M 8/04223* (2013.01); *H01M 8/04388* (2013.01); *H01M 8/04395* (2013.01); *H01M 8/04559* (2013.01); *H01M 8/04753* (2013.01); *H01M 8/04955* (2013.01); *H01M 8/04179* (2013.01); *H01M 2008/1095* (2013.01)

(58) Field of Classification Search
  CPC ...................................................... H01M 10/44
  USPC ........................................................ 320/135
  See application file for complete search history.

(56) References Cited

U.S. PATENT DOCUMENTS 5,820,172 A * 10/1998 Brigham ................ B60K 6/485
                                                              180/65.26
5,898,282 A *  4/1999 Drozdz .................. B60L 11/123
                                                              180/65.235

(Continued)

FOREIGN PATENT DOCUMENTS

EP      2 602 853 A1    6/2013
JP      2004-172028     6/2004

(Continued)

Primary Examiner — Yalkew Fantu
(74) Attorney, Agent, or Firm — Finnegan, Henderson, Farabow, Garrett & Dunner, LLP

(57) ABSTRACT

A voltage control method for a fuel cell may include: interrupting electrical connection between the fuel cell and a load in a low load state; supplying oxygen to the fuel cell in accordance with a preset condition during the electrical connection is interrupted; detecting an OCV of the fuel cell after oxygen is supplied to the fuel cell in accordance with the preset condition; reducing an amount of oxygen supplied to the fuel cell when the OCV is higher than a target voltage by a first value or larger; increasing the amount of oxygen when the OCV is lower than the target voltage by a second value or larger; and keeping the amount of oxygen when the OCV is lower than a sum of the target voltage and the first value and higher than a value obtained by subtracting the second value from the target voltage.

13 Claims, 11 Drawing Sheets

(51) Int. Cl.
  *H01M 8/04955* (2016.01)
  *H01M 8/04089* (2016.01)
  *H01M 8/04223* (2016.01)
  *H01M 8/0438* (2016.01)
  *H01M 8/04537* (2016.01)
  *H01M 8/04746* (2016.01)
  *B60L 11/18* (2006.01)
  *H01M 8/04119* (2016.01)
  *H01M 8/1018* (2016.01)

(56) References Cited

U.S. PATENT DOCUMENTS

| | | | | |
|---|---|---|---|---|
| 5,929,594 | A * | 7/1999 | Nonobe | B60L 11/1881 320/104 |
| 6,455,180 | B1 * | 9/2002 | Mowery | G01R 31/3658 429/432 |
| 6,580,977 | B2 * | 6/2003 | Ding | B60L 11/1887 180/307 |
| 2005/0118472 | A1 * | 6/2005 | Yang | B60L 11/1887 320/101 |
| 2006/0003205 | A1 | 1/2006 | Yoshida et al. | |
| 2006/0210853 | A1 * | 9/2006 | Fukuda | H01M 8/04097 429/415 |
| 2009/0169937 | A1 | 7/2009 | Umayahara | |
| 2010/0055521 | A1 | 3/2010 | Umayahara et al. | |
| 2016/0141682 | A1 | 5/2016 | Yamanaka et al. | |
| 2016/0141684 | A1 | 5/2016 | Yamanaka et al. | |

FOREIGN PATENT DOCUMENTS

| | | |
|---|---|---|
| JP | 2007-335151 A | 12/2007 |
| JP | 2008-052937 A | 3/2008 |
| JP | 2009-307970 A | 12/2009 |
| JP | 2010-244937 | 10/2010 |
| JP | 2013-105534 A | 5/2013 |
| JP | 2013-161571 | 8/2013 |
| JP | 2014-002948 A | 1/2014 |
| JP | 2016-096088 A | 5/2015 |
| JP | 2016-096087 A | 5/2016 |
| KR | 10-2005-0075438 A | 7/2005 |
| WO | WO 2004/049488 A2 | 6/2004 |

* cited by examiner

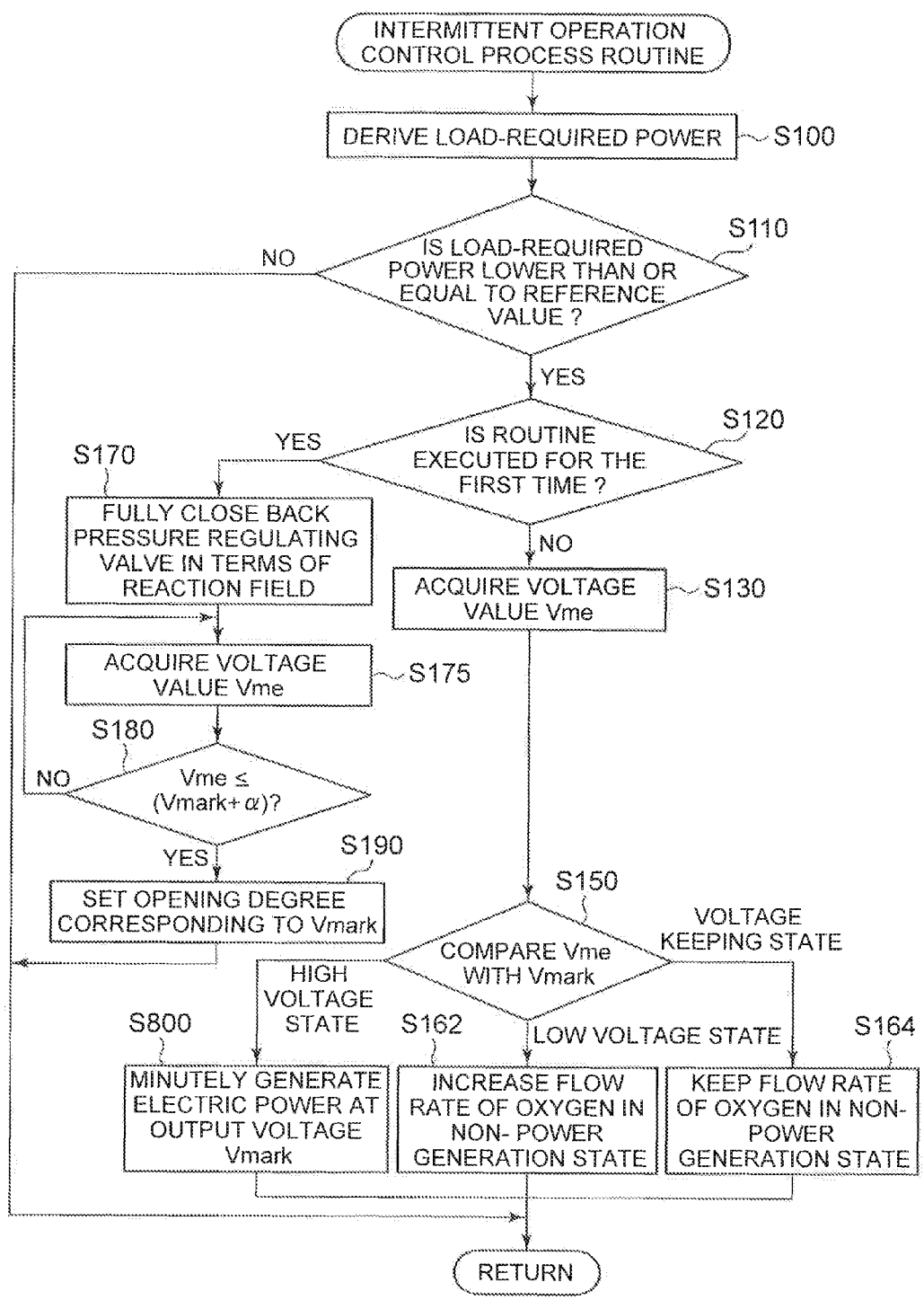

POWER SUPPLY SYSTEM AND VOLTAGE CONTROL METHOD FOR FUEL CELL

INCORPORATION BY REFERENCE

The disclosure of Japanese Patent Application No. 2014-232250 filed on Nov. 15, 2014 including the specification, drawings and abstract is incorporated herein by reference in its entirety.

BACKGROUND

Technical Field

The present disclosure relates to a power supply system and a voltage control method for a fuel cell.

Background

In a power supply system including a fuel cell, when electric power is extracted from the power supply system in response to an electric power required by a load (hereinafter, also referred to as load-required power), there is a case where the load-required power temporarily extremely decreases even during operation of the power supply system. A system including a fuel cell generally has such a property that the energy efficiency of the overall system decreases in the case where electric power generated by the fuel cell is extremely small. Therefore, as one control that is executed when the load-required power required on the power supply system is extremely small, control for stopping the power generation of the fuel cell has been executed so far. A required electric power has been output to the load from a secondary battery mounted in the power supply system together with the fuel cell.

When the power generation of the fuel cell is stopped in the state where hydrogen remains in an anode passage of the fuel cell and oxygen remains in a cathode passage of the fuel cell, the fuel cell exhibits an extremely high open circuit voltage (OCV). When the open circuit voltage of the fuel cell becomes excessively high, the potential of the electrode (cathode) of the fuel cell becomes extremely high, and elution (degradation) of a catalyst proceeds in the cathode, with the result that the power generation performance and durability of the fuel cell decrease.

After the power generation of the fuel cell is stopped, hydrogen remaining in the anode passage permeates to the cathode passage via the electrolyte membrane of the fuel cell, and the reaction by which hydrogen is oxidized on the cathode proceeds. As a result, after a while from the stop of the power generation of the fuel cell, the open circuit voltage decreases (the cathode potential decreases) because of consumption of oxygen remaining in the cathode passage. In such a case, the cathode catalyst is reduced, and elution of the cathode catalyst more easily occurs when the cathode potential has increased again thereafter. Therefore, when the load-required power becomes extremely small, it is desired to keep the voltage of the fuel cell (electrode potential) within an appropriate range.

As a method for keeping the voltage of the fuel cell within an appropriate range when the load-required power becomes extremely small, there is suggested a method of continuing minute power generation in the fuel cell even after the load-required power becomes extremely small (see, for example, Japanese Patent Application JP 2013-161571 A). As a method of continuing minute power generation, for example, there is suggested, for example, a method of stopping supply of oxygen to the fuel cell until the output voltage of the fuel cell decreases to a lower limit of the above-described predetermined range and, after the output voltage has decreased to the lower limit, oxygen is supplied to the fuel cell until the output voltage increases to an upper limit of the predetermined range.

However, if the power generation of the fuel cell is continued even after the load-required power becomes extremely small, there can occur a situation that unrequired excessive power generation is carried out only for the purpose of keeping the voltage. Electric power excessively generated in this way is allowed to be utilized after the electric power has been once charged into a secondary battery. However, a method of storing electric power generated by the fuel cell once in the secondary battery is lower in energy efficiency than the case where electric power generated by the fuel cell is directly utilized, and leads to a decrease in the energy efficiency of the overall system including the fuel cell.

SUMMARY

Embodiments of the present disclosure provide a power supply system and a voltage control method for a fuel cell.

A first aspect of the present disclosure may include a voltage control method for a fuel cell in a power supply system including the fuel cell configured to supply an electric power to a load. The voltage control method may include: interrupting electrical connection between the fuel cell and the load in a low load state where an electric power required by the load is lower than or equal to a predetermined reference value; supplying oxygen to the fuel cell in accordance with a preset condition when the electrical connection between the fuel cell and the load is interrupted, the preset condition being a condition for supplying the fuel cell with oxygen required to adjust an open circuit voltage of the fuel cell to a predetermined target voltage; detecting the open circuit voltage of the fuel cell after oxygen is supplied to the fuel cell in accordance with the preset condition; in a first voltage state where the detected open circuit voltage is higher than the target voltage by a first value or larger, reducing an amount of oxygen supplied to the fuel cell; in a second voltage state where the detected open circuit voltage is lower than the target voltage by a second value or larger, increasing the amount of oxygen supplied to the fuel cell; and in a voltage keeping state where the detected open circuit voltage is lower than a sum of the target voltage and the first value and higher than a value obtained by subtracting the second value from the target voltage, keeping the amount of oxygen supplied to the fuel cell.

According to the first aspect of the present disclosure, in the low load state where the load-required power is lower than or equal to the preset reference value, disclosed embodiments may keep the open circuit voltage of the fuel cell near the target voltage without causing the fuel cell to generate an electric power. Therefore, disclosed embodiments may avoid excessive power generation and decreased energy efficiency of the power supply system due to, for example, storing generated electric power in a secondary battery.

The voltage control method according to the first aspect of the present disclosure may further include: determining, in the low load state, whether a first state or a second state applies, the first state being a state where there is a higher probability that the load quickly requires the electric power than a probability that the load quickly requires the electric power in the second state; using a predetermined first target voltage as the target voltage when it is determined that the first state applies; and using a second target voltage as the target voltage when it is determined that the second state applies, the second target voltage being lower than the first target voltage.

According to the above aspect, when it is determined that the first state applies, the first state being a state where there may be a high probability that a load-required power is quickly indicated by the load, the higher first target voltage may be used as the target voltage of the fuel cell. Therefore, disclosed embodiments may ensure that there is oxygen in the fuel cell and ensure responsiveness at the time when the load-required power is increased subsequently. In addition, the lower second target voltage may be used as the target voltage of the fuel cell when it is determined that the second state applies, the second state being a state where there may be a lower probability that a load-required power is quickly indicated by the load than that in the first state. Therefore, even when variations in the open circuit voltage of each cell of the fuel cell increase, it may be possible to suppress excessive voltage increases of a single cell, which may improve the durability of the fuel cell as a whole.

The voltage control method according to the first aspect of the present disclosure may further include: using a first target voltage as the target voltage when a time elapsed after oxygen is supplied to the fuel cell in accordance with the preset condition in the low load state is shorter than a preset reference time; and changing the target voltage from the first target voltage to a second target voltage lower than the first target voltage when the preset reference time has elapsed after oxygen is supplied to the fuel cell in accordance with the preset condition.

When disclosed embodiments continue to control using the first target voltage as the target voltage, variations increase in the open circuit voltage of each individual cell of the fuel cell. According to the above aspect, because the target voltage may be changed to the second target voltage, which may be lower than the first target voltage, it is possible to suppress excessive voltage increases from occurring in a single cell, which may improve the durability of the fuel cell as a whole.

The voltage control method according to the first aspect of the present disclosure may further include: determining, in the low load state, whether a shift position is a predetermined drive position or a predetermined non-drive position; using a predetermined first target voltage as the target voltage when the shift position is determined to be the predetermined drive position; and using a second target voltage as the target voltage when the shift position is determined to be the predetermined non-drive position, the second target voltage being lower than the first target voltage.

In the above configuration, the voltage control method according to the first aspect of the present disclosure may further include: using the first target voltage as the target voltage when a time elapsed after oxygen is supplied to the fuel cell in accordance with the preset condition is shorter than a preset reference time and when the shift position is determined to be the predetermined drive position; and changing the target voltage from the first target voltage to the second target voltage when the preset reference time has elapsed after oxygen is supplied to the fuel cell in accordance with the preset condition and when the shift position is determined to be the predetermined drive position.

The voltage control method according to the first aspect of the present disclosure may further include: determining, in the low load state, whether a vehicle including the fuel cell is in a first state or a second state, the load having a higher probability of requiring a predetermined responsiveness of the electric power in the first state than in the second state, the predetermined responsiveness being higher than or equal to a predetermined level; using a predetermined first target voltage as the target voltage when the vehicle is in the first state; and using a second target voltage as the target voltage when the vehicle is in the second state, the second target voltage being lower than the first target voltage.

The voltage control method according to the first aspect of the present disclosure may further include changing the target voltage from a first target voltage to a second target voltage lower than the first target voltage when the open circuit voltage of the fuel cell decreases, after oxygen is supplied to the fuel cell in accordance with the preset condition in the low load state, by a preset allowable value or larger with respect to the first target voltage set as the target voltage.

According to the above aspect, when the open circuit voltage of the fuel cell has decreased with respect to the first target voltage by at least the allowable voltage value, the target voltage may be changed to the lower second target voltage in order to suppress a single cell from having a high voltage at an undesirable level that may be caused by variations in the open circuit voltage of each of the single cells. By not executing control for increasing the decreased open circuit voltage of the fuel cell to the first target voltage but changing the target voltage to the lower value, it may be possible to suppress fluctuations in the open circuit voltage of the fuel cell and suppress degradation of the electrode catalyst of the fuel cell due to the fluctuations.

The voltage control method according to the first aspect of the present disclosure may further include temporarily stopping supply of oxygen to the fuel cell before oxygen is supplied to the fuel cell after a target value of the open circuit voltage of the fuel cell is changed from the first target voltage to the second target voltage.

According to the above aspect, it may be possible to reduce variations in the open circuit voltage of each single cell, which have occurred while the first target voltage is used as the target voltage.

A second aspect of the present disclosure may include a voltage control method for a fuel cell in a power supply system including the fuel cell configured to supply an electric power to a load. The voltage control method may include: supplying oxygen to the fuel cell in accordance with a preset condition in a low load state where an electric power required by the load is lower than or equal to a predetermined reference value, the preset condition being a condition for supplying the fuel cell with oxygen required to adjust a voltage of the fuel cell to a predetermined target voltage; detecting the voltage of the fuel cell after oxygen is supplied to the fuel cell in accordance with the preset condition; causing the fuel cell to generate an electric power by setting an output voltage to the target voltage in a first voltage state where the detected voltage is higher than the target voltage by a first value or larger; in a second voltage state where the detected voltage is lower than the target voltage by a second value or larger, increasing an amount of oxygen supplied to the fuel cell in a state where electrical connection between the fuel cell and the load is interrupted; and keeping the amount of oxygen supplied to the fuel cell in a voltage keeping state where the detected voltage is lower than a sum of the target voltage and the first value and is higher than a value obtained by subtracting the second value from the target voltage.

According to the second aspect of the present disclosure, at least in the low load state where the load-required power is lower than or equal to the preset reference value, it may be possible to keep the voltage of the fuel cell near the target voltage without causing the fuel cell to generate an electric power. Therefore, it may be possible to suppress unrequired power generation and suppress a decrease in the energy efficiency of the power supply system due to, for example, storing generated electric power in a secondary battery.

A power supply system according to a third aspect of the present disclosure may include: a fuel cell configured to supply an electric power to a load; an oxygen supply unit configured to supply oxygen to a cathode of the fuel cell; an oxygen amount regulating unit configured to regulate an amount of oxygen supplied to the cathode by the oxygen supply unit; a load interruption unit configured to interrupt electrical connection between the fuel cell and the load in a low load state where an electric power required by the load is lower than or equal to a predetermined reference value; and a voltage sensor configured to detect an open circuit voltage of the fuel cell. The oxygen amount regulating unit may be configured to drive the oxygen supply unit in accordance with a preset condition in the low load state, the preset condition being a condition for supplying the fuel cell with oxygen required to adjust the open circuit voltage of the fuel cell to a predetermined target voltage. The oxygen amount regulating unit may be configured to drive, after the oxygen supply unit is driven, the oxygen supply unit in a first voltage state to decrease the amount of oxygen supplied to the fuel cell, the first voltage state being a state where the detected open circuit voltage is higher than the target voltage by a first value or larger. The oxygen amount regulating unit may be configured to drive, after the oxygen supply unit is driven, the oxygen supply unit in a second voltage state to increase the amount of oxygen supplied to the fuel cell, the second voltage state being a state where the detected open circuit voltage is lower than the target voltage by a second value or larger.

According to the third aspect of the present disclosure, in the low load state where the load-required power may be lower than or equal to the preset reference value, it may be possible to keep the open circuit voltage of the fuel cell near the target voltage without causing the fuel cell to generate an electric power. Therefore, it may not be required to carry out unrequired excessive power generation, and it may be possible to suppress a decrease in the energy efficiency of the power supply system due to, for example, storing generated electric power in a secondary battery. Control for adjusting the amount of oxygen supplied in order to bring the open circuit voltage of the fuel cell close to the target voltage may be executed by increasing or reducing the amount of oxygen supplied on the basis of the correlation between the open circuit voltage of the fuel cell and the target voltage, so it may not be required to directly measure the amount of oxygen supplied, and it may be possible to simplify the system configuration.

In the third aspect of the present disclosure, the oxygen supply unit may include an oxygen supply passage, an oxygen introducing unit, a bypass passage, a flow dividing valve, and a flow regulating valve. The oxygen supply passage may be a passage connected to the cathode. The oxygen introducing unit may be configured to introduce oxygen into the oxygen supply passage. The bypass passage may branch off from the oxygen supply passage, and be configured to guide oxygen supplied from the oxygen introducing unit without allowing the oxygen to pass through the cathode. The flow dividing valve may be provided at a position at which the bypass passage branches off from the oxygen supply passage, and be configured to change a proportion of distribution of oxygen distributed between the oxygen supply passage and the bypass passage depending on a state of opening of the flow dividing valve. The flow regulating valve may be provided in the oxygen supply passage, and be configured to change the amount of oxygen supplied to the cathode. The oxygen amount regulating unit may be configured to adjust the amount of oxygen supplied to the cathode by changing at least one of an amount of oxygen introduced by the oxygen introducing unit, the state of opening of the flow dividing valve, and an opening degree of the flow regulating valve.

In the third aspect of the present disclosure, the oxygen amount regulating unit may be configured to adjust the amount of oxygen supplied to the cathode by changing the opening degree of the flow regulating valve in a state where the amount of oxygen introduced by the oxygen introducing unit and the state of opening of the flow dividing valve are fixed.

A power supply system according to a fourth aspect of the present disclosure may include: a fuel cell configured to supply an electric power to a load; an oxygen supply unit configured to supply oxygen to a cathode of the fuel cell; at least one electronic control unit configured to adjust an amount of oxygen supplied by the oxygen supply unit to the cathode and to control a state of output of the fuel cell; a load interruption unit configured to interrupt electrical connection between the fuel cell and the load; and a voltage sensor configured to detect a voltage of the fuel cell. The electronic control unit may be configured to drive the oxygen supply unit in accordance with a preset condition in a low load state, the preset condition being a condition for supplying the fuel cell with oxygen required to adjust the voltage of the fuel cell to a predetermined target voltage. The electronic control unit may be configured to drive the oxygen supply unit to increase the amount of oxygen, which is supplied to the cathode, after the oxygen supply unit is driven in accordance with the preset condition, in a second voltage state, and in a state where the load interruption unit interrupts the electrical connection between the fuel cell and the load, the second voltage state being a state where the detected voltage is lower than the target voltage by a second value or larger. The electronic control unit may be configured to control the state of output of the fuel cell to change an output voltage of the fuel cell to the target voltage after the electronic control unit drives the oxygen supply unit in accordance with the preset condition, and in a first voltage state where the detected voltage is higher than the target voltage by a first value or larger.

The aspects of the present disclosure may be implemented in modes, such as a mobile unit on which a power supply system is mounted as a driving power supply, a high potential avoiding control method for a fuel cell in a power supply system including the fuel cell, a computer program that implements the above-described voltage control method or high potential avoiding control method, and a non-transitory storage medium that stores the computer program.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 12 is a flowchart that shows an intermittent operation control process routine according to some embodiments of the disclosure.

DETAILED DESCRIPTION OF EMBODIMENTS

Figure 1:
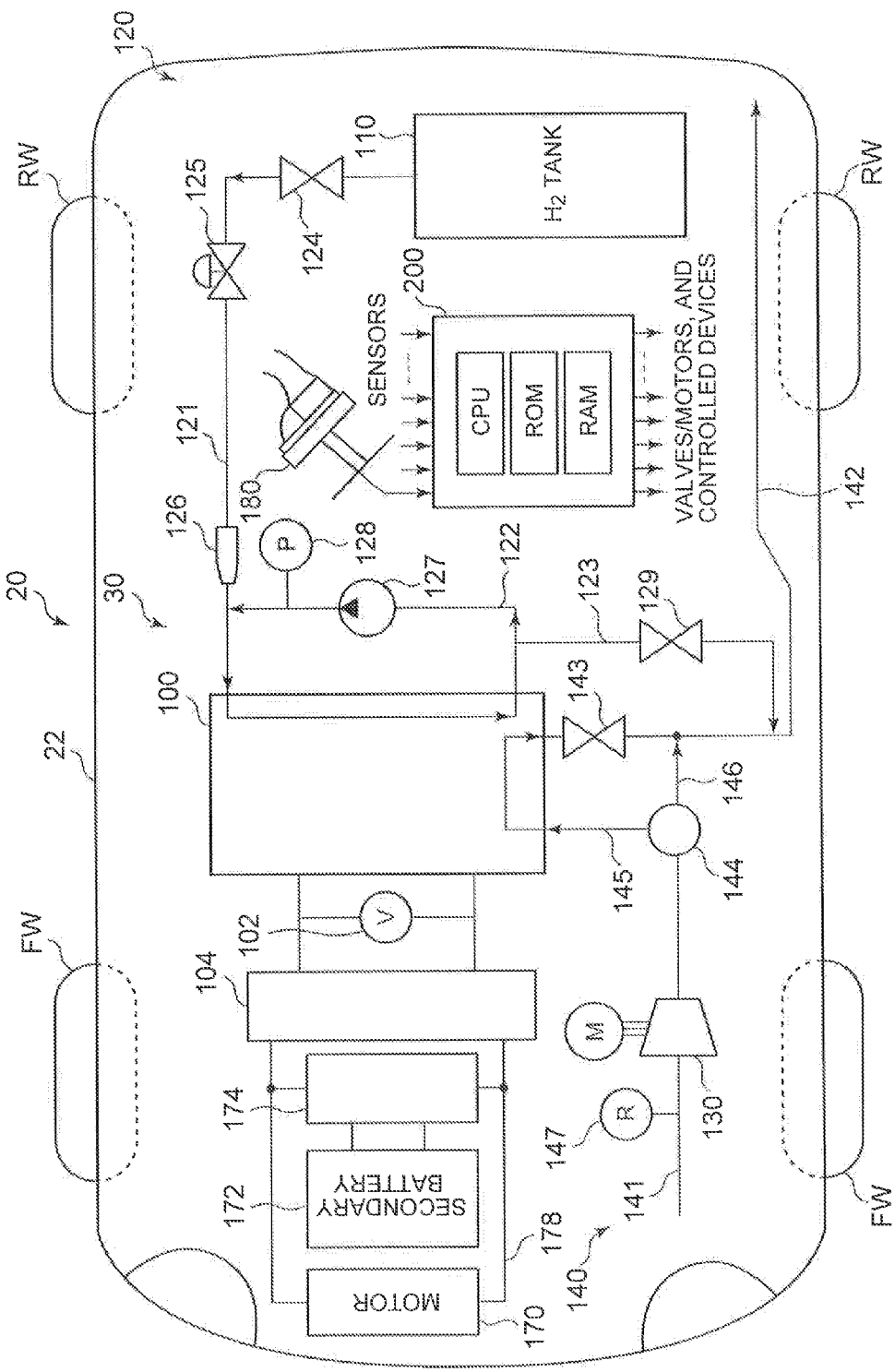
FIG. 1 is a block diagram that shows the schematic configuration of a fuel-cell vehicle according to some embodiments of the disclosure.

FIG. 1 is a block diagram that shows the schematic configuration of a fuel-cell vehicle according to a first embodiment of the disclosure. The fuel-cell vehicle 20 includes a power supply system 30 mounted on a vehicle body 22. The power supply system 30 and a motor 170 for driving the fuel-cell vehicle 20 are connected to each other by wiring 178. Electric power is exchanged via the wiring 178 between the power supply system 30 and the motor 170.

The power supply system 30 includes a fuel cell 100, a hydrogen gas supply unit 120, an air supply unit 140, a secondary battery 172, a DC-DC converter 104, a DC-DC converter 174, and a control unit 200. The hydrogen gas supply unit 120 includes a hydrogen tank 110. The air supply unit 140 includes a compressor 130. The power supply system 30 further includes a refrigerant circulation unit (not shown in FIG. 1). The refrigerant circulation unit circulates refrigerant inside the fuel cell for cooling the fuel cell in order to keep the temperature of the fuel cell 100 within a predetermined range. The power supply system 30 is able to supply electric power to a load including the motor 170 from only the fuel cell 100, only the secondary battery 172, or both the fuel cell 100 and the secondary battery 172 at the same time.

The fuel cell 100 has a stack structure in which a plurality of single cells are stacked. The fuel cell 100 according to the first embodiment is a solid polymer fuel cell. In each of the single cells that constitute the fuel cell 100, on both sides of an electrolyte membrane, a passage through which hydrogen flows is formed in an anode (hereinafter, also referred to as anode passage), and a passage through which oxygen flows is formed in a cathode (hereinafter, also referred to as cathode passage). The fuel cell 100 is connected to the load including the motor 170 via the DC-DC converter 104 and the wiring 178. The voltage of the fuel cell 100 is detected by a voltage sensor 102. A detected signal of the voltage sensor 102 is output to the control unit 200.

The DC-DC converter 104 has the function of changing the state of output of the fuel cell 100 upon reception of a control signal from the control unit 200. Specifically, the DC-DC converter 104 has the function of setting an output voltage at the time when the fuel cell 100 generates electric power. The DC-DC converter 104 has the function of stepping up the output voltage to a desired voltage at the time when the fuel cell 100 supplies the generated electric power to the load. The DC-DC converter 104 includes a diode. By providing the diode in the DC-DC converter 104, electrical connection between the fuel cell 100 and the load is interrupted when an output current from the fuel cell 100 becomes smaller than or equal to a predetermined value. In the first embodiment, the diode of the DC-DC converter 104 may be regarded as a load interruption unit according to the disclosure.

The hydrogen tank 110 of the hydrogen gas supply unit 120 may be, for example, a hydrogen cylinder that stores high-pressure hydrogen gas or a tank that includes a hydrogen storing alloy inside and that stores hydrogen in the hydrogen storing alloy. The hydrogen gas supply unit 120 includes a hydrogen supply passage 121, a circulation passage 122 and a hydrogen release passage 123. The hydrogen supply passage 121 runs from the hydrogen tank 110 to the fuel cell 100. The circulation passage 122 circulates unconsumed hydrogen gas (e.g., anode off-gas) to the hydrogen supply passage 121. The hydrogen release passage 123 is used to release anode off-gas to the atmosphere. In the hydrogen gas supply unit 120, hydrogen gas stored in the hydrogen tank 110 is subjected to opening or closing of the hydrogen supply passage 121 by an open-close valve 124 and reduction in pressure by a pressure-reducing valve 125, and is supplied from a hydrogen supply device 126 (for example, an injector) downstream of the pressure-reducing valve 125 to the anode passage of the fuel cell 100. The flow rate of hydrogen that circulates through the circulation passage 122 is regulated by a circulation pump 127. The driving amounts of the hydrogen supply device 126 and the circulation pump 127 are regulated by the control unit 200 in response to a load-required power with reference to the pressure of circulated hydrogen, detected by a pressure sensor 128.

Part of hydrogen gas that flows through the circulation passage 122 is subjected to opening or closing regulation of the open-close valve 129 in the hydrogen release passage 123 branched off from the circulation passage 122, and is released to the atmosphere at a predetermined timing. Thus, it is possible to emit impurities other than hydrogen e.g., water vapor and nitrogen) in the hydrogen gas that circulates through the circulation passage 122, to the outside of the passage, so it is possible to suppress an increase in the concentration of impurities in hydrogen gas that is supplied to the fuel cell 100. The open/close timing of the open-close valve 124 is adjusted by the control unit 200.

The air supply unit 140 includes a first air passage 141, a second air passage 145, a third air passage 146, a flow dividing valve 144, an air release passage 142, a back pressure regulating valve 143 and a flow rate sensor 147 in addition to the compressor 130. The entire amount of air that is introduced by the compressor 130 flows through the first air passage 141. The second air passage 145 and the third air passage 146 are provided so as to bifurcate from the first air passage 141. The flow dividing valve 144 is provided at a portion at which the first air passage 141 bifurcates into the second air passage 145 and the third air passage 146. By changing the state of opening of the flow dividing valve 144, it is possible to change the distribution proportion of air flowing from the first air passage 141 to the second air passage 145 or the third air passage 146. Part of the second air passage 145 constitutes a cathode passage in the fuel cell 100. The third air passage 146 is a bypass passage that guides air without passing through the fuel cell 100. The second air passage 145 and the third air passage 146 merge into the air release passage 142. The back pressure regulating valve 143 is a throttle valve provided in the second air passage 145 at a portion upstream of the merging point with the third air passage 146. By adjusting the opening degree of the back pressure regulating valve 143, it is possible to change a back pressure for the cathode passage in the fuel cell 100. The air release passage 142 is a passage for releasing air (e.g., cathode off-gas), which has passed through the second air passage 145, to the atmosphere together with air that has passed through the third air passage 146. The above-described hydrogen release passage 123 is connected to the air release passage 142, and hydrogen that is released via the hydrogen release passage 123 is diluted by air flowing through the air release passage 142 in advance of releasing the hydrogen to the atmosphere. The flow rate sensor 147 is provided in the first air passage 141, and detects the total flow rate of air that is introduced via the first air passage 141.

In the first embodiment, the air supply unit 140 may be regarded as an oxygen supply unit according to the disclosure. In the air supply unit 140, by changing at least one condition that is selected from among the driving amount of the compressor 130, the state of opening of the flow dividing valve 144 and the opening degree of the back pressure regulating valve 143, it is possible to regulate the flow rate of air (oxygen flow rate) that is supplied to the cathode passage of the fuel cell 100. In the first embodiment, the back pressure regulating valve 143 includes a stepping motor (not shown in FIG. 1), and is able to highly accurately adjust the valve opening degree of the back pressure regulating valve 143 to an arbitrary opening degree by controlling the number of steps of the stepping motor. The driving amount of the compressor 130, the state of opening of the flow dividing valve 144 and the opening degree of the back pressure regulating valve 143 are regulated by the control unit 200. The air supply unit 140, for example, may include a humidifying device that humidifies air to be supplied to the fuel cell 100 in the first air passage 141.

In the first embodiment, the first air passage 141 and the second air passage 145 may be regarded as an oxygen supply passage according to the disclosure. The compressor 130 may be regarded as an oxygen introducing unit according to the disclosure. The third air passage 146 may be regarded as a bypass passage according to the disclosure. The back pressure regulating valve 143 may be regarded as a flow regulating valve according to the disclosure.

The secondary battery 172 is connected to the wiring 178 via the DC-DC converter 174. The DC-DC converter 174 and the DC-DC converter 104 are connected to the wiring 178 in parallel with each other. For example, a lead storage battery, a nickel-metal hydride battery, a lithium ion battery, or the like, may be employed as the secondary battery 172. A remaining capacity monitor (not shown in FIG. 1) is provided together with the secondary battery 172. The remaining capacity monitor is used to detect the remaining capacity (also referred to as the state of charge (SOC)) of the secondary battery 172. The detected remaining capacity is output to the control unit 200. The remaining capacity monitor may be configured as an SOC meter that integrates a current value of charge and discharge in the secondary battery 172 with respect to a time. Alternatively, the remaining capacity monitor may be formed of a voltage sensor that detects the voltage of the secondary battery 172, instead of the SOC meter.

The DC-DC converter 174 has a charge/discharge control function for controlling charging or discharging of the secondary battery 172, and controls charging or discharging of the secondary battery 172 upon reception of a control signal from the control unit 200. Other than the above, the DC-DC converter 174 draws electric power stored in the secondary battery 172 and applies voltage to the motor 170 by setting an output-side target voltage under control of the control unit 200, and variably adjusts the electric power drawn state and the level of voltage that is applied to the motor 170. When it is not required to charge or discharge the secondary battery 172, the DC-DC converter 174 interrupts the secondary battery 172 from the wiring 178.

The control unit 200 is formed of a so-called microcomputer including a CPU, a ROM, a RAM, and the like. The CPU executes logical operation. The control unit 200 executes various controls associated with the fuel-cell vehicle 20 by acquiring detected signals from various sensors, such as an accelerator operation amount sensor 180, a shift position sensor, a vehicle speed sensor and an ambient temperature sensor, in addition to the above-described sensors of the hydrogen gas supply unit 120 or the air supply unit 140. For example, the control unit 200 obtains a load-required power on the basis of, for example, the detected signal of the accelerator operation amount sensor 180, and outputs drive signals to portions of the power supply system 30 such that an electric power corresponding to the load-required power is obtained from at least one of the fuel cell 100 and the secondary battery 172. Specifically, when the electric power is obtained from the fuel cell 100, the amount of gas that is supplied from the hydrogen gas supply unit 120 and the amount of gas that is supplied from the air supply unit 140 are controlled such that a desired electric power is obtained from the fuel cell 100. The control unit 200 controls the DC-DC converters 104, 174 such that a desired electric power is supplied to the motor 170. In the first embodiment, the control unit 200 may be regarded as an oxygen amount regulating unit or an electronic control unit according to the disclosure. The control unit 200 further includes a timer, and is able to measure an elapsed time from when various signals are input or various processes are executed.

In the fuel-cell vehicle 20 according to the first embodiment, during operation of the power supply system 30, a plurality of operation modes including a normal operation mode and an intermittent operation mode are changed. The normal operation mode is an operation mode that is selected when a load-required power required on the power supply system 30 exceeds a preset reference value, and is an operation mode in which at least part of a load-required power including an electric power required by the motor 170 is provided by an electric power that is generated by the fuel cell 100. The intermittent operation mode is an operation mode in which the power generation of the fuel cell 100 is stopped when a load-required power required on the power supply system 30 is lower than or equal to the preset reference value.

The load that receives electric power supplied from the power supply system 30 includes a vehicle auxiliary and a fuel cell auxiliary in addition to the motor 170 that drives the fuel-cell vehicle 20. Therefore, in the power supply system 30 according to the first embodiment, a load-required power includes an electric power required by the motor 170, an electric power required by the vehicle auxiliary and an electric power required by the fuel cell auxiliary. The vehicle auxiliary includes, for example, an air conditioning apparatus (e.g., air conditioner), illumination devices, hazard lamps, direction indicator lamps, and the like. The fuel cell auxiliary includes, for example, the compressor 130, the circulation pump 127, various valves, such as the flow dividing valve 144 and the back pressure regulating valve 143, the air release passage 142, the above-described refrigerant pump for circulating refrigerant and a radiator fan for cooling refrigerant. When the remaining capacity (e.g., SOC) of the secondary battery 172 has decreased, the secondary battery 172 can also be part of the load. In the first embodiment, a load-required power is obtained as the total amount of electric powers required by the above-described loads, and the intermittent operation mode is selected when the load-required power is lower than or equal to the reference value. When the intermittent operation mode is selected, the voltage of the fuel cell 100 during a stop of power generation is controlled to a predetermined range.

Figure 2:
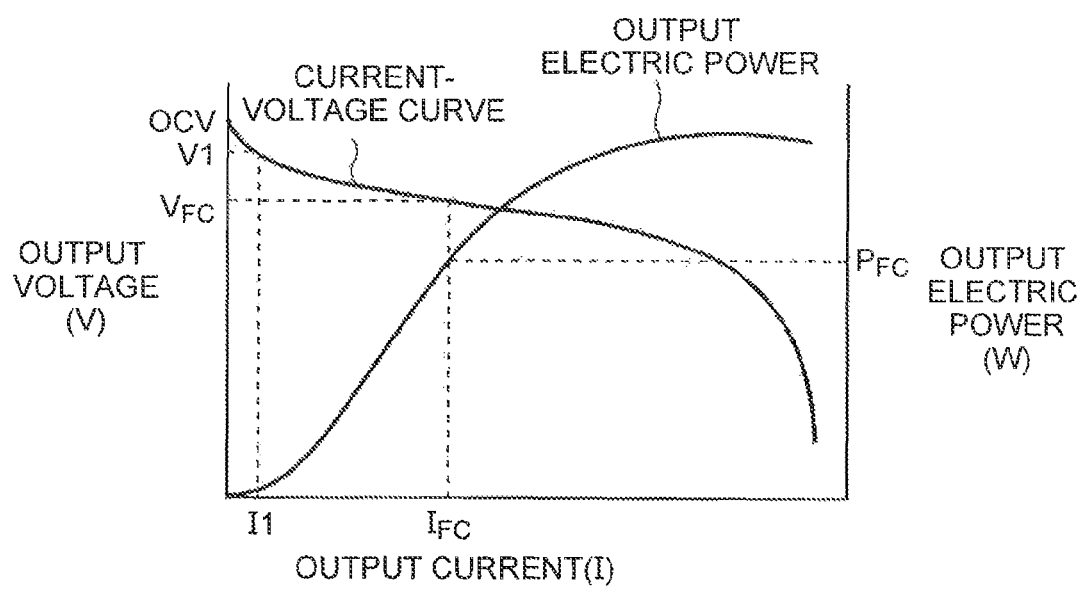
FIG. 2 is a graph that illustrates the correlation between an output current and an output voltage or an output electric power in the fuel cell according to some embodiments of the disclosure.

FIG. 2 is a graph that schematically illustrates the correlation between an output current and an output voltage or output electric power in the fuel cell 100. Hereinafter, control at the time when the normal operation mode is selected will be simply described, and control over the fuel cell 100 at the time when the intermittent operation mode is selected will be described in detail.

In the first embodiment, the amount of electric power generated by the fuel cell 100 in the normal operation mode is controlled by determining the output voltage of the fuel cell 100. As is apparent from the correlation between an output current and an output electric power, shown in FIG. 2, in the fuel cell 100, when an electric power $P_{FC}$ to be output is determined, an output current $I_{FC}$ of the fuel cell 100 is determined. As is apparent from the current-voltage curve (also referred to as an I-V curve) shown in FIG. 2, when the output current $I_{FC}$ of the fuel cell 100 is determined, the output voltage $V_{FC}$ of the fuel cell 100 is determined. When the normal operation mode is selected, the control unit 200 controls the amount of electric power generated by the fuel cell 100 to a desired amount by transmitting the thus obtained output voltage $V_{FC}$ to the DC-DC converter 174 as a target voltage.

At the time of stopping the power generation of the fuel cell 100 when the intermittent operation mode is selected, the output current of the fuel cell 100 becomes zero. At the time of stopping the power generation of the fuel cell 100, that is, when the output current is adjusted to zero by interrupting the fuel cell 100 from the load in the state where sufficient hydrogen and oxygen for power generation are supplied to the fuel cell 100, the fuel cell 100 exhibits an extremely high open circuit voltage (OCV) as shown in FIG. 2. This indicates that the electrode potential of the cathode of the fuel cell 100 becomes exceedingly high. It is known that, when the electrode potential of the fuel cell 100 becomes high, a catalyst metal, such as platinum, of the electrode elutes and, as a result, the performance of the fuel cell 100 decreases. Therefore, in order to suppress a decrease in the performance of the fuel cell 100, it is desired to suppress an excessive increase in the electrode potential in the fuel cell 100. In the first embodiment, by controlling the amount of oxygen that is supplied to the cathode passage during a stop of the power generation of the fuel cell 100, an excessive increase in the electrode potential of the cathode is suppressed.

Figure 3:
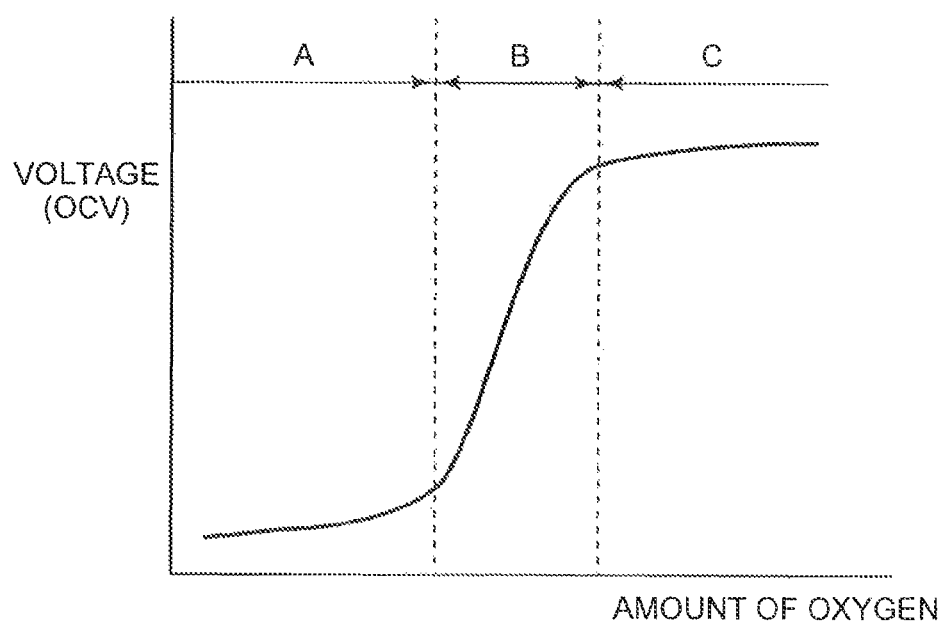
FIG. 3 is a graph that schematically illustrates the correlation between the amount of oxygen supplied and the open circuit voltage of the fuel cell according to some embodiments of the disclosure.

FIG. 3 is a graph that schematically illustrates the correlation between the amount of oxygen supplied and the open circuit voltage (OCV) of the fuel cell 100 at the time when the amount of oxygen that is supplied to the cathode passage is changed in the state where a sufficient amount of hydrogen for generating electric power in the normal operation mode is supplied to the anode passage during a stop of the power generation of the fuel cell 100. When the amount of oxygen that is supplied to the cathode passage is extremely small, the OCV almost does not change at an extremely low level even when the amount of oxygen supplied changes. The range of such amount of oxygen supplied is indicated by the arrow A as an oxygen deficient region A in FIG. 3. When the amount of oxygen supplied is further increased, the OCV rapidly increases with an increase in the amount of oxygen supplied. The range of such amount of oxygen supplied is indicated by the arrow B as an intermediate region B in which the equivalence ratio of hydrogen that reacts with supplied oxygen to the oxygen may be regarded as 1 in FIG. 3. When the amount of oxygen supplied is further increased, the OCV almost does not change at an extremely high level even when the amount of oxygen supplied changes. The range of such amount of oxygen supplied is indicated by the arrow C as a hyperoxic region C in FIG. 3. In the first embodiment, when the intermittent operation mode is selected, the amount of oxygen supplied is controlled such that the OCV indicates a predetermined voltage within the intermediate region B. That is, in the first embodiment, a specific voltage within the intermediate region B is set in advance as a target voltage Vmark of the OCV when the intermittent operation mode is selected, and the amount of oxygen that is supplied to the fuel cell 100 is adjusted such that the open circuit voltage of the fuel cell 100 becomes the target voltage Vmark.

As described above, in the air supply unit 140 according to the first embodiment, the amount of air (e.g., the amount of oxygen) that is supplied to the cathode passage of the fuel cell 100 is determined depending on the driving amount of the compressor 130, the state of opening of the flow dividing valve 144 and the opening degree of the back pressure regulating valve 143. In the first embodiment, when the intermittent operation mode is selected, among these parameters, by fixing the driving amount of the compressor 130 and the state of opening of the flow dividing valve 144 and changing the opening degree of the back pressure regulating valve 143, the OCV of the fuel cell 100 is controlled to the target voltage Vmark. Therefore, in the first embodiment, together with the above-described target voltage Vmark, the opening degree of the back pressure regulating valve 143 (the driving amount of the back pressure regulating valve 143) for supplying the fuel cell with oxygen by which the target voltage Vmark is obtained is stored in advance as an initial value in the memory in the control unit 200. The opening degree of the back pressure regulating valve 143 for achieving the target voltage Vmark may be, for example, empirically obtained in advance.

After the power generation of the fuel cell 100 has been stopped, in each single cell, hydrogen permeates from the anode passage to the cathode passage via the electrolyte membrane, and the oxidation reaction of permeated hydrogen proceeds in the cathode. As a result, oxygen inside the cathode passage is consumed as a result of the oxidation reaction of hydrogen that has permeated through the electrolyte membrane. Therefore, in the fuel cell 100 during a stop of the power generation, in order to obtain a desired open circuit voltage that falls within the intermediate region B, in addition to the amount of oxygen that is required from FIG. 3 in response to the desired open circuit voltage (the amount of oxygen that is required to generate electromotive force), the amount of oxygen that is consumed by the oxidation reaction of permeated hydrogen (the amount of oxygen consumed by permeated hydrogen) further needs to be supplied. That is, the amount of oxygen to be supplied to the fuel cell 100 (the amount of oxygen for keeping a cell voltage) in order to obtain the desired open circuit voltage when the intermittent operation mode is selected is expressed by the following mathematical expression (1).

(Amount of Oxygen for Keeping Cell Voltage)= (Amount of Oxygen Required to Generate Electromotive force)+(Amount of Oxygen Consumed by Permeated Hydrogen)   (1)

When the opening degree of the back pressure regulating valve 143 is adjusted to the opening degree stored in the memory in the control unit 200, and when the amount of oxygen that is supplied to the fuel cell 100 just satisfies the mathematical expression (1), the open circuit voltage of the fuel cell 100 becomes the target voltage Vmark. However, the amount of hydrogen that permeates through the electrolyte membrane fluctuates in response to the hydrogen pressure in the anode passage, the internal temperature of the fuel cell 100 and the internal humidity of the fuel cell 100. Therefore, for example, when the amount of oxygen supplied becomes insufficient because of these factors, the open circuit voltage of the fuel cell 100 becomes lower than the target voltage Vmark; whereas, when the amount of oxygen supplied is excessive, the open circuit voltage of the fuel cell 100 becomes higher than the target voltage Vmark. In the first embodiment, the open circuit voltage of the fuel cell 100 is controlled to approach the target voltage Vmark by increasing or reducing the amount of oxygen that is supplied to the fuel cell 100 on the basis of the result of comparison between the detected open circuit voltage of the fuel cell 100 and the target voltage Vmark. The details of control will be described later.

The target voltage Vmark (as will be described later, an average cell voltage in the first embodiment) of the OCV of the fuel cell 100, which is set when the intermittent operation mode is selected, is desirably lower than or equal to 0.9 V, more desirably lower than or equal to 0.85 V and further desirably lower than or equal to 0.8 V from the viewpoint of suppressing degradation (e.g., elution) of the electrode catalyst due to a high potential.

In contrast, it is presumable that, as the cell voltage of the cathode decreases, that is, as the oxygen partial pressure in the cathode passage decreases, the electrode catalyst of the cathode becomes more easy to be reduced. For example, an oxide film on the surface of the catalyst may disappear. When the electrode catalyst of the cathode is reduced, there can occur an inconvenience in the next time that, when oxygen is supplied into the cathode passage and the potential of the cathode has increased, elution of the electrode catalyst of the cathode becomes easy to proceed. Therefore, when the intermittent operation mode is selected, it is desirable that the voltage of any one of the cells that constitute the fuel cell 100 not decrease to 0 V. Therefore, from the viewpoint of suppressing the above-described inconvenience due to a decrease in cell voltage, the target voltage Vmark (average cell voltage) of the OCV, which is set when the intermittent operation mode is selected, is desirably higher than or equal to 0.1 V and further desirably higher than or equal to 0.2 V.

When the intermittent operation mode is selected, the load-required power is lower than or equal to the reference value. However, the power supply system 30 may be in operation (e.g., when a command to stop the system is not provided by a user), so there is a possibility that the load-required power increases again within a short time. Therefore, when the load-required power has increased again, it is desirable not to excessively reduce the amount of oxygen in the cathode passage from the viewpoint of quickly obtaining a desired electric power. That is, from the viewpoint of responsiveness at the time when the load-required power has increased next time, it is desirable that the target voltage Vmark (average cell voltage) of the OCV, which is set when the intermittent operation mode is selected, be higher. Therefore, in order to ensure responsiveness to the load-required power, the target voltage Vmark is desirably, for example, higher than or equal to 0.6 V and further desirably higher than or equal to 0.7 V.

Even when the intermittent operation mode is selected, the amount of hydrogen, which allows an electric power, exceeding the load-required power that is a reference to select the intermittent operation mode, to be immediately generated, is kept in the anode passage inside the fuel cell 100. That is, even when the intermittent operation mode is selected, the circulation pump 127 continues to be driven, and hydrogen is supplied from the hydrogen supply device 126 in order to compensate for lost hydrogen that has permeated to the cathode passage via the electrolyte membrane.

Even when the intermittent operation mode is selected, part of hydrogen flowing through the circulation passage 122 is released to the outside of the fuel-cell vehicle 20 via the open-close valve 129 provided in the hydrogen release passage 123, and the concentration of impurities (e.g., the concentration of nitrogen and water vapor) in hydrogen flowing through the circulation passage 122 is suppressed. When the intermittent operation mode is selected, nitrogen in air flows in from the cathode passage to the anode passage via the electrolyte membrane. When the intermittent operation mode is selected, hydrogen that has permeated from the anode passage to the cathode passage is oxidized on the cathode to produce water, and part of the produced water permeates to the anode passage as water vapor. Therefore, when it is determined that the concentration of impurities in the anode passage exceeds a reference concentration, the control unit 200 executes the process of opening the open-close valve 129 for a predetermined time. Because the amount of permeation of nitrogen or hydrogen depends on an elapsed time, the time when the concentration of impurities in the anode passage exceeds the reference concentration may be, for example, the time when an elapsed time from when the process of opening the open-close valve 129 is executed last time exceeds a predetermined reference time. The timing of executing the process of opening the open-close valve 129 is not only based on the above-described elapsed time but also may be determined by directly measuring the concentration of impurities (e.g., the concentration of nitrogen and/or the concentration of water vapor) in the circulation passage 122.

Figure 4:
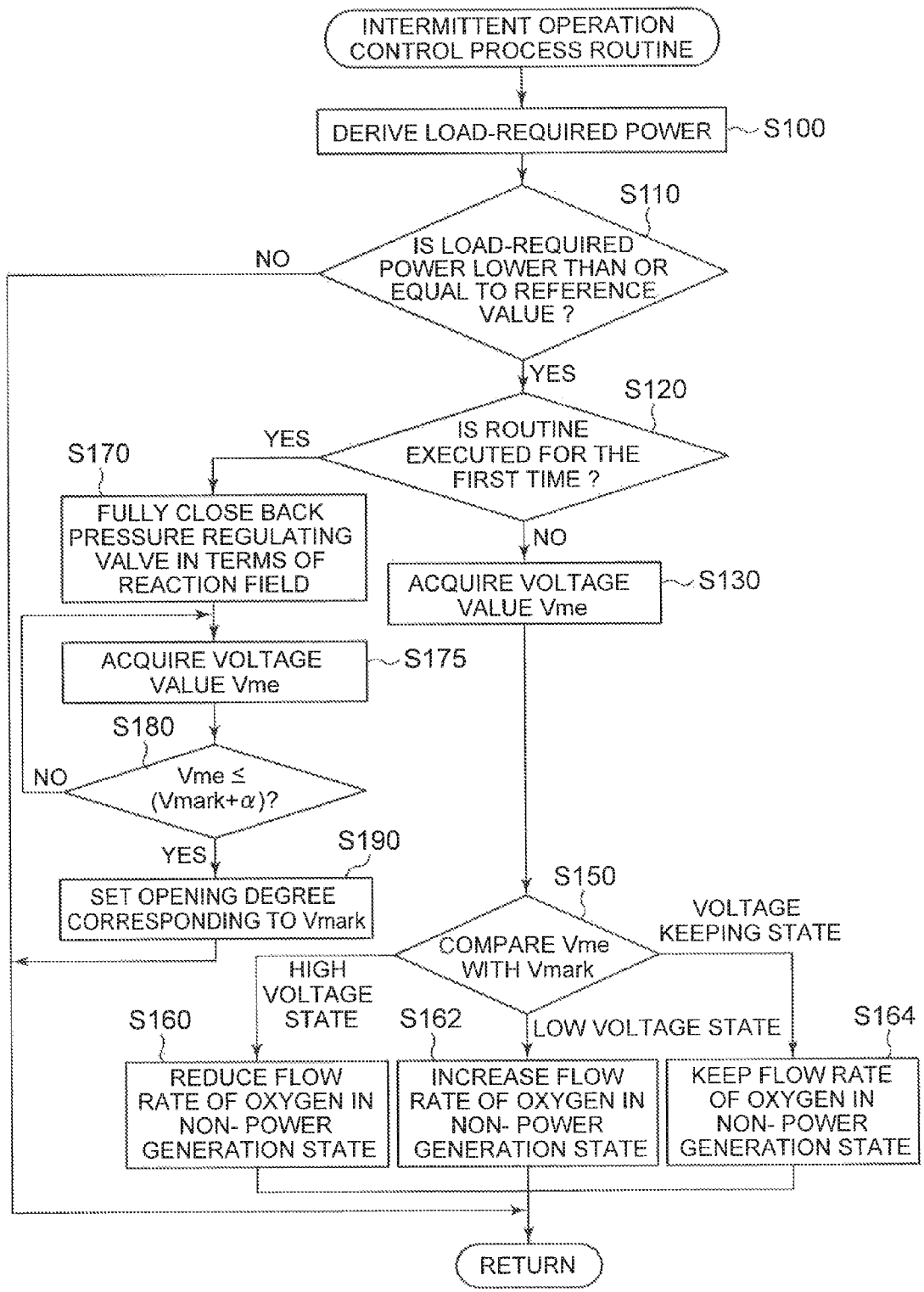
FIG. 4 is a flowchart that shows an intermittent operation control process routine according to some embodiments of the disclosure.

FIG. 4 is a flowchart that shows an intermittent operation control process routine that is executed in the CPU of the control unit 200 as the operation when the intermittent operation mode is selected. The routine is repeatedly executed during operation of the power supply system 30 until a command to stop the system is input by the user after the power supply system 30 is started up. The interval at which the routine is repeatedly executed is set to a time (for example, 1 to 5 seconds) longer than a time that is required for the amount of oxygen that is supplied to the cathode passage actually changes as a result of changing the opening degree of the back pressure regulating valve 143 in accordance with the routine.

When the routine is executed, the CPU derives a load-required power (step S100). The load-required power is the total sum of an electric power required by the motor 170 and an electric power required by the vehicle auxiliary and the fuel cell auxiliary as described above. The electric power required by the motor 170 is obtained on the basis of the detected signals of the accelerator operation amount sensor 180 and the vehicle speed sensor. The electric power required by the vehicle auxiliary and the fuel cell auxiliary is obtained on the basis of driving signals that are output to the auxiliaries.

After that, the CPU determines whether the derived load-required power is lower than or equal to the predetermined reference value (step S110). When it is determined that the load-required power is not lower than or equal to the reference value, the intermittent operation mode is not selected, and the CPU ends the routine.

When it is determined in step S110 that the load-required power is lower than or equal to the reference value, the process for the intermittent operation mode is continued. When it is once determined in step S110 that the load-required power is lower than or equal to the reference value, until it is determined in step S110 that the load-required power exceeds the reference value, the state where the operation mode of the power supply system 30 is the intermittent operation mode continues while the intermittent operation control process routine shown in FIG. 4 is repeatedly executed.

When it is determined in step S110 that the load-required power is lower than or equal to the reference value, the CPU determines whether the running intermittent operation control process routine is the process that is executed for the first time after the operation mode of the power supply system 30 becomes the current intermittent operation mode (step S120). When it is determined that the running routine is the process that is executed for the first time after becoming the current intermittent operation mode, the CPU changes the back pressure regulating valve 143 to a fully closed state in terms of the reaction field (step S170). A voltage value Vme of the fuel cell 100 is acquired from the voltage sensor 102 (step S175).

The fully closed state in terms of the reaction field means the state of opening of the back pressure regulating valve 143 at the time when the amount of oxygen at the boundary between the oxygen deficient region A and the intermediate region B in FIG. 3 is supplied. That is, the fully closed state in terms of the reaction field means the state of opening of the back pressure regulating valve 143 at the time when an amount of oxygen that is required to oxidize hydrogen that permeates through the electrolyte membrane during a stop of the power generation of the fuel cell 100 is supplied to the fuel cell 100. When the back pressure regulating valve 143 is changed to the fully closed state in terms of the reaction field in step S170, the amount of oxygen that is supplied to the fuel cell 100 significantly decreases as compared to that when the normal operation mode is selected. In the first embodiment, the opening degree of the back pressure regulating valve 143 in the fully closed state in terms of the reaction field is adjusted in advance, and is stored in the memory in the control unit 200.

When it is determined in step S120 that the running routine is the process that is executed for the first time after becoming the current intermittent operation mode, that is, just before switching from the normal operation mode to the intermittent operation mode, an excessive amount of oxygen is supplied to the fuel cell 100. Therefore, if the power generation of the fuel cell 100 is stopped just after step S170, there is a possibility that the OCV of the fuel cell 100 excessively increases. Therefore, after step S170, for example, the power generation of the fuel cell 100 may be continued in the state where the output voltage of the fuel cell 100 is lower than or equal to a permissible upper limit value. When the power generation of the fuel cell 100 is continued, the amount of oxygen in the cathode passage of the fuel cell 100 is consumed through the power generation and rapidly decreases. Therefore, the output current of the fuel cell 100 gradually decreases. In this way, when the output current of the fuel cell 100 decreases to some extent, electric power that is supplied from the fuel cell 100 to the load is interrupted by the function of the diode of the DC-DC converter 104, and the fuel cell 100 stops the power generation.

After step S170, when the fuel cell 100 stops the power generation, hydrogen that has permeated through the electrolyte membrane is oxidized on the cathode, so the amount of oxygen in the cathode passage of the fuel cell 100 quickly decreases. When the amount of oxygen in the fuel cell 100 decreases in this way, the OCV of the fuel cell 100 after a stop of the power generation decreases to a value near the permissible upper limit value. When the power generation stopped state of the fuel cell 100 further continues, the OCV of the fuel cell 100 decreases to a value lower than or equal to the upper limit value.

In step S175, the CPU acquires the output voltage of the fuel cell 100 when the fuel cell 100 is generating electric power, and acquires the OCV of the fuel cell 100 when the power generation of the fuel cell 100 is stopped. In the first embodiment, the voltage value Vme is the average cell voltage obtained by dividing the voltage value of the overall stack by the number of the cells included in the stack. The voltage value of the overall stack is detected by the voltage sensor 102.

When the voltage value Vme of the fuel cell 100 is acquired in step S175, the CPU compares the acquired voltage value Vme with the sum of the target voltage Vmark and α (step S180). The target voltage Vmark is stored in advance in the memory of the control unit 200 as described above. α is a positive value, and is a value provided in order to prevent the situation that an increase in the amount of oxygen that is supplied to the cathode passage is too late and, as a result, the OCV of the fuel cell 100 decreases below the target voltage Vmark. As described above, because the voltage value Vme gradually decreases after a stop of the power generation of the fuel cell 100, acquisition of the voltage value Vme in step S175 and determination of step S180 are repeated until the voltage value Vme becomes lower than or equal to the sum of the target voltage Vmark and α in the first embodiment.

When it is determined in step S180 that the voltage value Vme becomes lower than or equal to the sum of the target voltage Vmark and α, the CPU outputs a driving signal to the stepping motor of the back pressure regulating valve 143 such that the opening degree of the back pressure regulating valve 143 becomes the opening degree stored in advance as the opening degree for achieving Vmark (step S190), and then ends the routine. That is, the amount of oxygen that is supplied to the fuel cell 100 is increased from the amount of oxygen corresponding to the fully closed state in terms of the reaction field to the amount of oxygen corresponding to the opening degree for achieving Vmark.

When the voltage value Vme decreases to the target voltage Vmark and then the amount of oxygen supplied is increased, the voltage of the fuel cell 100 further decreases by the time a desired amount of oxygen reaches the cathode, and may become lower than Vmark. In the first embodiment, because the amount of oxygen supplied is increased at the timing at which Vme has decreased to the sum of the target voltage Vmark and α, it is possible to prevent the situation that the voltage of the fuel cell 100 becomes lower than the target voltage Vmark. The value of α may be set as needed in consideration of responsiveness at the time of driving the back pressure regulating valve 143 or a speed at which oxygen increased in supplied amount reaches the cathode (which is influenced by, for example, the passage resistance or passage length in the cathode passage).

When it is determined in step S120 that the running routine is not the process that is executed for the first time after becoming the current intermittent operation mode, that is, opening degree control over the back pressure regulating valve 143 has been already started, the CPU acquires the voltage value Vme of the fuel cell 100 from the voltage sensor 102 (step S130). At the time of acquiring the voltage value Vme in step S130, because the fuel cell 100 has already stopped the power generation, so the OCV of the fuel cell 100 is acquired in step S130.

After the voltage value Vme is acquired in step S130, the CPU compares the acquired voltage value Vme with the target voltage Vmark (step S150). As a result of the comparison, when the voltage value Vme is higher than the target voltage Vmark by a first value or larger (hereinafter, also referred to as high voltage state), the CPU reduces the flow rate of oxygen that is supplied to the cathode passage by reducing the opening degree of the back pressure regulating valve 143 in a non-power generation state (step S160), and then ends the routine. As a result of the comparison, when the voltage value Vme is lower than the target voltage Vmark by a second value or larger (hereinafter, also referred to as low voltage state), the CPU increases the flow rate of oxygen that is supplied to the cathode passage by increasing the opening degree of the back pressure regulating valve 143 in the non-power generation state (step S162), and then ends the routine. As a result of the comparison, when the fuel cell 100 is not in the above-described high voltage state or low voltage state (e.g., when the fuel cell 100 is in a voltage keeping state), the CPU keeps the amount of oxygen that is supplied to the cathode passage by keeping the opening degree of the current back pressure regulating valve 143 in the non-power generation state (step S164), and then ends the routine. The voltage keeping state may be regarded as a state where the detected open circuit voltage is lower than the sum of the target voltage and the first value and is higher than a value obtained by subtracting the second value from the target voltage. In the first embodiment, the high voltage state may be regarded as a first voltage state according to the disclosure. The low voltage state may be regarded as a second voltage state according to the disclosure.

In the first embodiment, when the opening degree of the back pressure regulating valve 143 is reduced in step S160 or when the opening degree of the back pressure regulating valve 143 is increased in step S162, the driving amount of the stepping motor of the back pressure regulating valve 143 is changed such that the opening degree is changed by the amount of one step. That is, the opening degree is changed by the minimum unit at the time of changing the opening degree of the back pressure regulating valve 143. Thus, fluctuations in the voltage of the fuel cell 100 are suppressed. However, the amount of change in the opening degree per once in the back pressure regulating valve 143 may be changed to the amount of two steps or more.

The first value used to make determination to reduce the amount of oxygen in step S160 and the second value used to make determination to increase the amount of oxygen in step S162 may be different from each other or may be the same. The first and second values just need to be positive values, and may be set arbitrarily in consideration of, for example, the responsiveness of a change in the flow rate of oxygen to the driving signal that is input to the back pressure regulating valve 143.

With the thus-configured power supply system 30 according to the first embodiment, in the low load state where the load-required power is lower than or equal to the preset reference value, it is possible to avoid the high potential state in the fuel cell 100 without causing the fuel cell 100 to generate electric power. Therefore, unrequired excessive power generation does not need to be carried out only for the purpose of avoiding the high potential state, so it is possible to suppress a decrease in the energy efficiency of the power supply system 30 due to, for example, once storing generated electric power in the secondary battery.

As is apparent from the I-V curve shown in FIG. 2, it is presumable that, as a method of avoiding the situation that the fuel cell exhibits a high OCV as a result of stopping the power generation of the fuel cell 100, there is a method of generating electric power at a low output (e.g., generating electric power at an output current of I1) such that the output voltage of the fuel cell 100 becomes a high voltage V1 that is an allowable level. A redundant electric power obtained in this way is allowed to be charged into the secondary battery 172. However, when electric power is output from the secondary battery 172 to the load after the secondary battery 172 has been once charged, energy efficiency decreases relative to when electric power is directly supplied from the fuel cell 100 to the load. Because the capacity of the secondary battery 172 has a limit, if the amount of electric power generated for the purpose of avoiding a high potential increases, in some embodiments there may be a possibility that low-output power generation for the purpose of avoiding a high potential cannot be continued or regenerative electric power during braking in the vehicle cannot be recovered. As a result, it may be difficult to appropriately keep an energy balance in the power supply system. In the first embodiment, in the predetermined low load state, it is possible to avoid the high potential state while the power generation is stopped, so it is possible to avoid the above-described inconvenience.

According to the first embodiment, it is possible to suppress fluctuations in the voltage of the fuel cell in the low load state, so it is possible to improve the durability of the fuel cell.

According to the first embodiment, at the time of supplying an amount of oxygen that is required to keep the voltage to the cathode passage, the amount of oxygen supplied is increased or reduced by adjusting the opening degree of the back pressure regulating valve 143 on the basis of the current OCV of the fuel cell 100. It is presumable that, as a method of adjusting the amount of oxygen that is supplied to the fuel cell 100, there is also a method of directly detecting the amount of oxygen supplied and changing the amount of oxygen supplied such that the amount of oxygen supplied becomes a desired amount. However, in this case, it is required to provide a flow meter for detecting the amount of oxygen that is supplied to the cathode passage (e.g., an air flow meter for detecting the amount of air). In the first embodiment, it is not required to provide such an air flow meter, so it is possible to simplify the system configuration.

According to the first embodiment, the passage of air that is supplied to the cathode passage is divided and then the amount or flow rate of oxygen supplied is controlled by the opening degree of the back pressure regulating valve 143, so it is possible to accurately control the amount of oxygen supplied. A method of increasing or reducing the driving amount of the compressor 130 to increase or reduce the amount of oxygen supplied is also presumable. However, the compressor 130 is a compressor that has a large flow rate range and that is compatible with the range of the lowest load-required power to the highest load-required power. Therefore, it is generally difficult to adjust a minute flow rate like keeping the voltage during a stop of the power generation in the first embodiment, so it is required to additionally provide a compressor compatible with a minute flow rate. In the first embodiment, control over the minute flow rate of air is possible with high accuracy without further providing such a compressor. However, control for bringing the voltage value Vme close to the target voltage Vmark may be executed by adjusting the amount of oxygen supplied in accordance with another method, such as providing another compressor compatible with a minute flow rate. In this case as well, a similar advantageous effect to that of the first embodiment is obtained, that is, it is possible to avoid a high potential while the power generation is stopped.

When the voltage value Vme is higher than the target voltage Vmark and the difference between the voltage value Vme and the target voltage Vmark is larger than the first value in step S150, it may be further determined whether it is a temporal delay in response. For example, just after the opening degree of the back pressure regulating valve 143 is changed from the fully closed state in terms of the reaction field to the opening degree corresponding to Vmark by starting the intermittent operation mode, there is a case where Vme temporarily becomes higher than the target voltage Vmark and the difference between the voltage value Vme and the target voltage Vmark temporarily becomes larger than the first value as a result of increasing supplied oxygen at the timing at which Vme has decreased to the sum of the target voltage Vmark and α. In this way, just after opening degree control over the back pressure regulating valve 143 has been started, it may be determined that it is a temporal delay in response, and the opening degree of the back pressure regulating valve 143 may not be changed even when Vme is higher than the target voltage Vmark by a predetermined value or larger. Whether it is a temporal delay in response may be, for example, determined on the basis of an elapsed time from when opening degree control over the back pressure regulating valve 143 is started (e.g., when step S190 is executed).

The time interval at which the intermittent operation process routine shown in FIG. 4 is repeatedly executed is desirably set so as to be longer than a response time that is taken from when the CPU outputs the driving signal for changing the opening degree to the back pressure regulating valve 143 to when the voltage value Vme changes. Even when the CPU outputs a command signal to change the opening degree of the back pressure regulating valve 143, it takes a certain time until the amount of oxygen supplied changes as a result of changing the opening degree of the back pressure regulating valve 143 and then the amount of oxygen that reaches the cathode changes. Therefore, when determination of step S150 is carried out again during then, there is a possibility that it is determined that the amount of oxygen supplied is still insufficient or still excessive even when the amount of change in the opening degree of the back pressure regulating valve 143 is sufficient, the opening degree of the back pressure regulating valve 143 is further changed, and, on the contrary, the amount of oxygen supplied becomes excessive or insufficient.

In the first embodiment, at the time of increasing or reducing the opening degree of the back pressure regulating valve 143 on the basis of the correlation between the voltage value Vme and the target voltage Vmark, an upper limit and/or lower limit of the opening degree of the back pressure regulating valve 143 may be set. The upper limit of the opening degree of the back pressure regulating valve 143 may be set to an opening degree smaller than a mechanical fully open state of the back pressure regulating valve 143. The upper limit may be, for example, set to a value set in advance for each target voltage Vmark as an opening degree at which the amount of oxygen that achieves the currently set target voltage Vmark is able to be supplied even when the amount of hydrogen that permeates through the electrolyte membrane becomes maximum. The lower limit of the opening degree of the back pressure regulating valve 143 does not need to be a mechanical fully closed state of the back pressure regulating valve 143. The lower limit may be, for example, set to an opening degree at which the effective sectional area of the passage in the back pressure regulating valve 143 becomes substantially zero.

In the first embodiment, the single value stored in the memory of the control unit 200 is used as the target voltage Vmark at the time when the intermittent operation mode is selected; however, another configuration may be employed. Hereinafter, the configuration that the target voltage Vmark is changed on the basis of the shift position in the fuel-cell vehicle 20 will be described as a second embodiment. The second embodiment differs from the first embodiment in only the operation for setting the target voltage.

Figure 5:
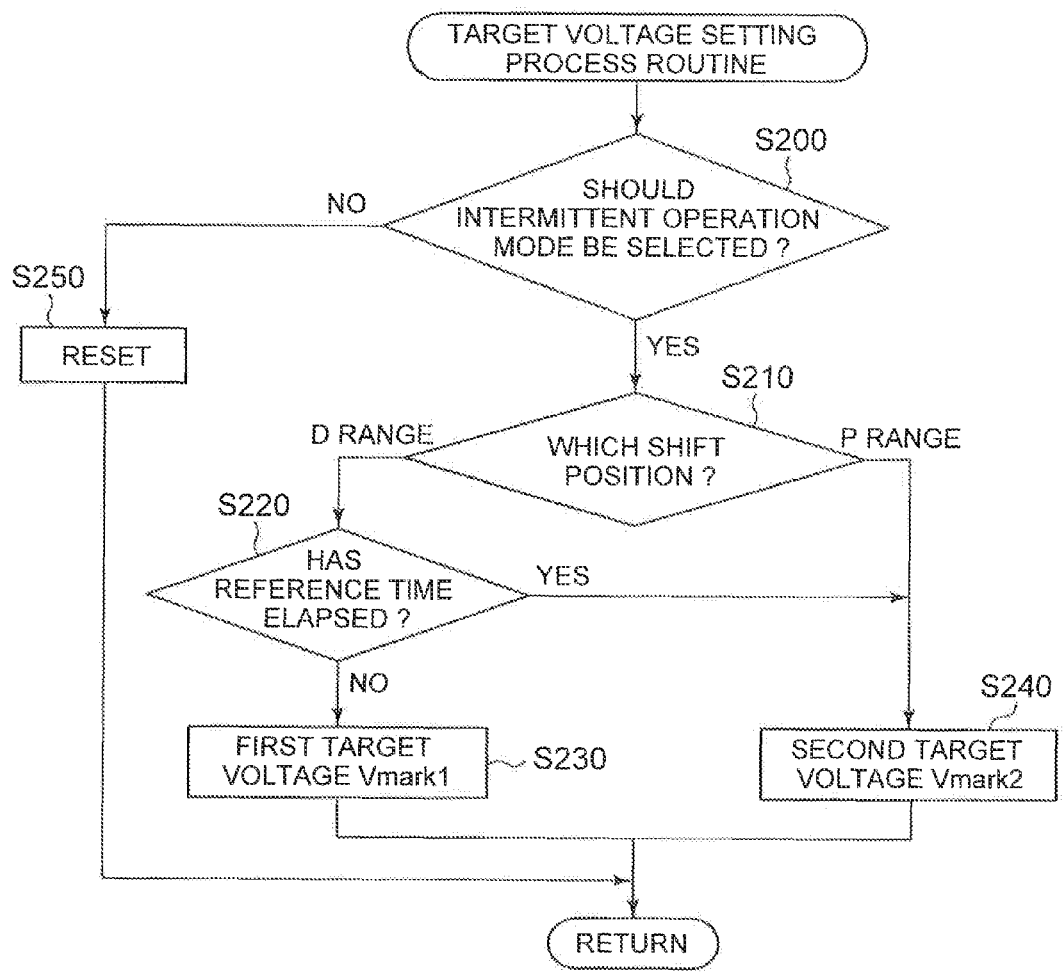
FIG. 5 is a flowchart that shows a target voltage setting process routine according to some embodiments of the disclosure.

FIG. 5 is a flowchart that shows a target voltage setting process routine that is executed in the fuel-cell vehicle 20 according to the second embodiment. The routine is repeatedly executed during operation of the power supply system 30 in parallel with the intermittent operation control process routine shown in FIG. 4 until a command to stop the system is input by the user after the power supply system 30 is started up. In the second embodiment, when the CPU executes the process using the target voltage Vmark in the intermittent operation control process routine shown in FIG. 4, the CPU executes the process using the latest target voltage set by the target voltage setting process routine shown in FIG. 5.

When the routine shown in FIG. 5 is executed, the CPU determines whether it is in the state where the intermittent operation mode should be selected (step S200). The process of step S200 is the same as the processes of step S100 and step S110 in FIG. 4. When it is determined in step S200 that it is not in the state where the intermittent operation mode should be selected (the load-required power exceeds the reference value), the CPU resets a stored elapsed time (described later) (step S250), and then ends the routine.

When it is determined in step S200 that it is in the state where the intermittent operation mode should be selected (e.g., the load-required power is lower than or equal to the reference value), the CPU acquires the detected signal from the shift position sensor, and determines the shift position (step S210). When it is determined in step S210 that the shift position is D range, the CPU determines whether an elapsed time from fulfillment of both the condition that the shift position is D range and the condition that the load-required power is a low load-required power corresponding to the intermittent operation mode exceeds a reference time set in advance (step S220). In the second embodiment, the control unit 200 measures an elapsed time from when it is first determined in step S200 that the intermittent operation mode should be selected in the state where the shift position is D range. This elapsed time is reset in step S250 when the intermittent operation mode is cancelled, that is, when it is determined in step S200 that it is not in the state where the intermittent operation mode should be selected.

When it is determined in step S220 that the elapsed time from when the intermittent operation mode is selected does not exceed the reference time, the CPU sets a first target voltage Vmark1 for the target voltage Vmark (step S230), and then ends the routine. When it is determined in step S220 that the elapsed time from when the intermittent operation mode is selected exceeds the reference time, the CPU sets a second target voltage Vmark2, lower than the first target voltage Vmark1, for the target voltage Vmark (step S240), and then ends the routine. When it is determined in step S210 that the shift position is P range as well, the CPU sets the second target voltage Vmark2 for the target voltage Vmark (step S240), and then ends the routine.

Figure 6:
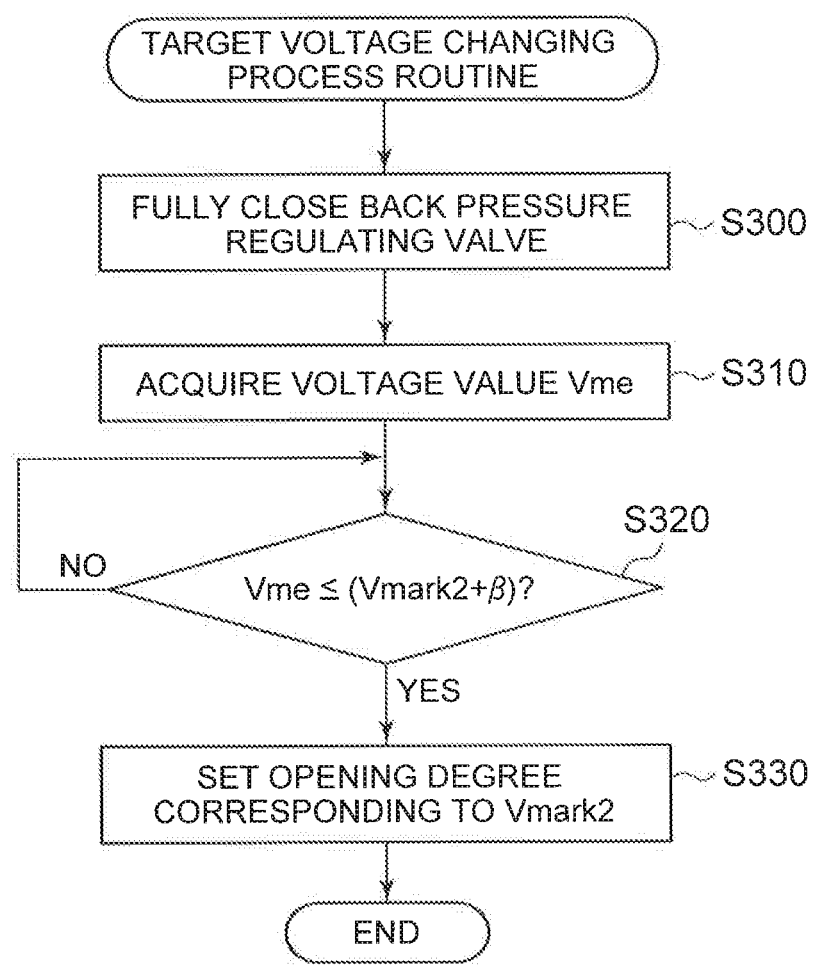
FIG. 6 is a flowchart that shows a target voltage changing process routine according to some embodiments of the disclosure.

FIG. 6 is a flowchart that shows a target voltage changing process routine that is executed by the CPU of the control unit 200. The routine is executed once by interrupt processing instead of the process shown in FIG. 4 when the second target voltage Vmark2 is set for the target voltage Vmark in the process shown in FIG. 5 and it is determined that the target voltage Vmark has been changed from the first target voltage Vmark1 to the second target voltage Vmark2.

When the routine is executed, the CPU outputs the driving signal for fully closing the back pressure regulating valve 143 (step S300). Thus, oxygen that is supplied into the cathode passage is stopped, and the voltage of the fuel cell 100 starts to decrease. After that, the CPU acquires the voltage value Vme, which is the current OCV (average cell voltage), from the voltage sensor 102 (step S310).

The CPU compares the voltage value Vme with the sum of the second target voltage Vmark2 and β (step S320). β, as well as α in step S180 of FIG. 4, is a positive value, and is a value provided in order to prevent the situation that the start of supplying oxygen to the cathode passage is too late and, as a result, the OCV of the fuel cell 100 decreases below the second target voltage Vmark2. In the second embodiment, determination of step S320 is repeated until the voltage value Vme becomes lower than or equal to the sum of the second target voltage Vmark2 and β. When it is determined in step S320 that the voltage value Vme becomes lower than or equal to the sum of the second target voltage Vmark2 and β, the CPU outputs the driving signal to the stepping motor of the back pressure regulating valve 143 such that the opening degree for achieving the second target voltage Vmark2 becomes the opening degree stored in advance (step S330), and then ends the routine.

The first target voltage Vmark1 and the second target voltage Vmark2 are stored in advance in the memory in the control unit 200, and the first target voltage Vmark1 is higher than the second target voltage Vmark2 as described above. Therefore, in the second embodiment, when the shift position is D range and the elapsed time from when the intermittent operation mode is selected has not reached the reference time, control over the amount of oxygen supplied based on FIG. 4 is executed by using a higher target voltage. When the shift position is D range and the elapsed time from when the intermittent operation mode is selected exceeds the reference time or when the shift position is P range, control over the amount of oxygen supplied based on FIG. 4 is executed by using a lower target voltage.

In the second embodiment, the state where the shift position is D range and the elapsed time from when the intermittent operation mode is selected has not exceeded the reference time may be regarded as a first state according to the disclosure. The state where the shift position is D range and the elapsed time from when the intermittent operation mode is selected has exceeded the reference time or the state where the shift position is P range may be regarded as a second state according to the disclosure.

Figure 7:
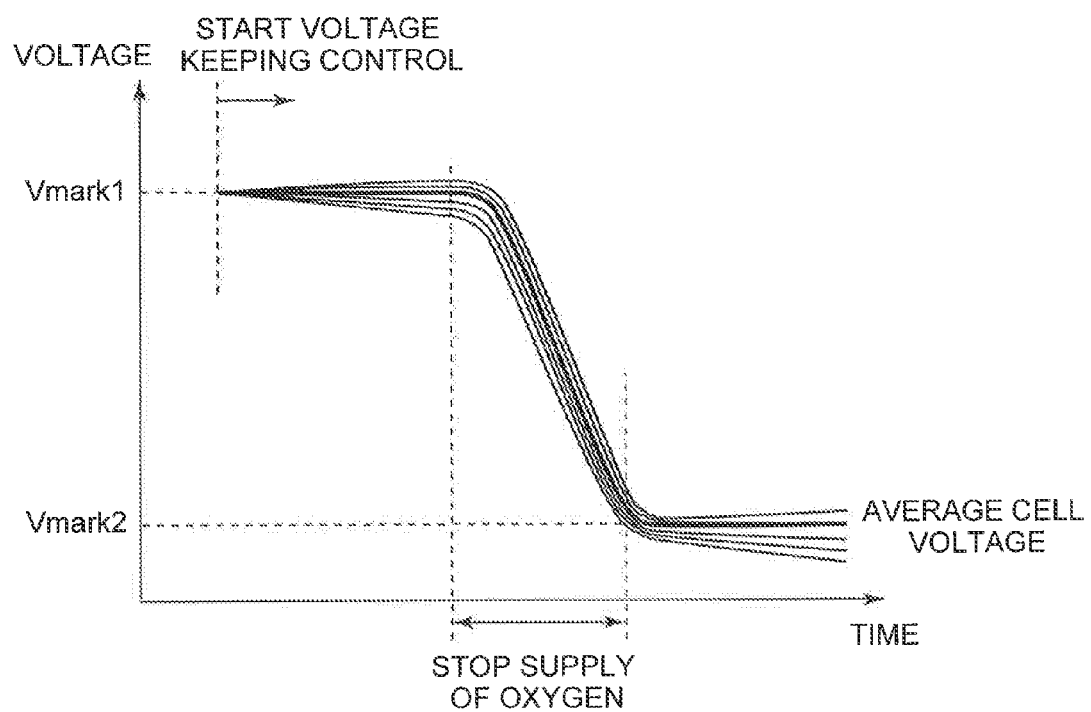
FIG. 7 is a graph that schematically illustrates the behavior of the open circuit voltage after voltage keeping control is started according to some embodiments of the disclosure.

FIG. 7 is a graph that conceptually illustrates the behavior of an open circuit voltage in each cell after voltage keeping control using the target voltage Vmark is started on the basis of the processes of FIG. 4 to FIG. 6. In FIG. 7, the average cell voltage is indicated by the wide line. As shown in FIG. 7, when voltage keeping control is started while the first target voltage Vmark1 is set for the target voltage Vmark, the average cell voltage is kept at the first target voltage Vmark1; however, variations in cell voltage gradually increase in the stack as a whole. After that, when supply of oxygen is stopped by changing the target voltage from the first target voltage Vmark1 to the second target voltage Vmark2, the open circuit voltage steeply decreases, and, after supply of oxygen is resumed, the average cell voltage is kept at the second target voltage Vmark2. After the average cell voltage is kept at the second target voltage Vmark2, variations in cell voltage gradually increase.

The first target voltage Vmark1 is desirably lower than or equal to 0.9 V, more desirably lower than or equal to 0.85 V and further desirably lower than or equal to 0.8 V from the viewpoint of suppressing degradation of the electrode catalyst due to a high potential. The first target voltage Vmark1 is desirably higher than or equal to 0.6 V and more desirably higher than or equal to 0.7 V from the viewpoint of, when the load has increased again in the D range state (e.g., when the accelerator becomes on), ensuring responsiveness for obtaining a desired electric power by immediately recovering the amount of oxygen in the cathode passage.

From the viewpoint of suppressing reduction of the electrode catalyst of the cathode, the voltage of any one of the single cells that constitute the fuel cell 100 is desirably a value higher than 0 V. Therefore, the second target voltage Vmark2 is desirably higher than or equal to 0.1 V and further desirably higher than or equal to 0.2 V. When the intermittent operation mode continues for a long time and, as a result, variations in the open circuit voltage of each single cell become large as well, the voltage of each of the single cells is desirably a voltage at which it is possible to sufficiently suppress elution of the electrode catalyst. Therefore, the second target voltage Vmark2 is desirably lower than or equal to 0.4 V and more desirably lower than or equal to 0.3 V.

The reference time that is used in determination of step S220 may be set as needed from the viewpoint of suppressing the open circuit voltage of the single cell that exhibits a maximum cell voltage within an allowable range when the average cell voltage of the fuel cell 100 is kept at the first target voltage Vmark1.

According to the second embodiment, when it is determined that there is a relatively high probability that the load-required power is quickly indicated by the load, voltage keeping control is executed by setting a higher target voltage when the intermittent operation mode is selected. Therefore, it is possible to ensure a relatively large amount of oxygen in the cathode passage and ensure responsiveness at the time when the load-required power has increased next time. When it is determined that there is a relatively low probability that the load-required power is quickly indicated by the load, voltage keeping control is executed by setting a lower target voltage when the intermittent operation mode is selected. Therefore, even when variations in cell voltage expand, occurrence of a single cell of which the voltage excessively increases is suppressed, so it is possible to improve the durability of the fuel cell 100 as a whole.

Particularly, in the second embodiment, when the reference time elapses while the shift position remains in D range, the target voltage Vmark is changed to a lower target voltage even when the shift position is not changed. Therefore, even when variations in cell voltage expand as a result of continuation of control using a specific target voltage and, as a result, there arises a single cell of which the voltage increases to an undesired level, it is possible to eliminate an excessive increase in voltage in part of the single cells without waiting for a command from the user, such as a change of the shift position.

In the second embodiment, at the time of changing the target voltage Vmark from the first target voltage Vmark1 to the second target voltage Vmark2, supply of oxygen is once stopped before starting control over the amount of oxygen supplied for bringing the voltage value Vme close to the second target voltage Vmark2. Therefore, it is possible to reduce variations in the open circuit voltage of each single cell, which occur while the first target voltage Vmark1 is used as the target voltage Vmark. The reason is presumable as follows. That is, while the first target voltage Vmark1 is used as the target voltage Vmark, the amount of oxygen that is supplied to the cathode varies among the single cells because of the influence of variations in passage resistance in each single cell, water in the passage, and the like, with the result that variations in open circuit voltage gradually expand. At this time, it is presumable that, when supply of oxygen is temporarily stopped, each of single cells of the fuel cell 100 similarly becomes an oxygen deficient state and, as a result, variations in open circuit voltage decrease.

In the second embodiment, it is presumable that there is a case where, after voltage keeping control using the second target voltage Vmark2 is started as a result of the fact that the shift position is changed to P range, the shift position is changed to D range while the load-required power remains lower than or equal to the reference value (as discussed in step S110). In such a case, as shown in FIG. 5, it is desirable that not the target value be set on the basis of the elapsed time from fulfillment of the condition that the shift position is D range and the load-required power is a low load-required power corresponding to the intermittent operation mode but the second target voltage Vmark2 that is a lower target voltage be kept. Thus, the frequency of fluctuations in voltage during the intermittent operation mode is suppressed, so it is possible to suppress degradation of the electrode catalyst due to fluctuations in voltage.

In FIG. 5, only the case where the shift position is D range or P range is described, and the description of the case where another range is selected is omitted. For example, when N range is selected as another range, a similar process to that of D range may be executed. Alternatively, when R range is selected, responsiveness during moving may be ensured by constantly using the first target voltage Vmark1 irrespective of the elapsed time from when R range is selected. D range and R range may be regarded as a drive position according to the disclosure. P range and N range may be regarded as a non-drive position according to the disclosure. When the drive position is selected, a responsiveness of the electric power higher than or equal to a predetermined level may be required by the motor 170, the secondary battery 172 and so on.

In the first embodiment, at the time when the flow rate of oxygen is increased or reduced in step S160 or step S162 on the basis of the result of comparison between the voltage value Vme and the target voltage Vmark in step S150, the opening degree of the back pressure regulating valve 143 is changed in the amount of one step of the stepping motor; however, another configuration may be employed. Hereinafter, the configuration that the amount of change in the flow rate of oxygen is changed in response to the difference between the voltage value Vme and the target voltage Vmark will be described as a third embodiment.

Figure 8:
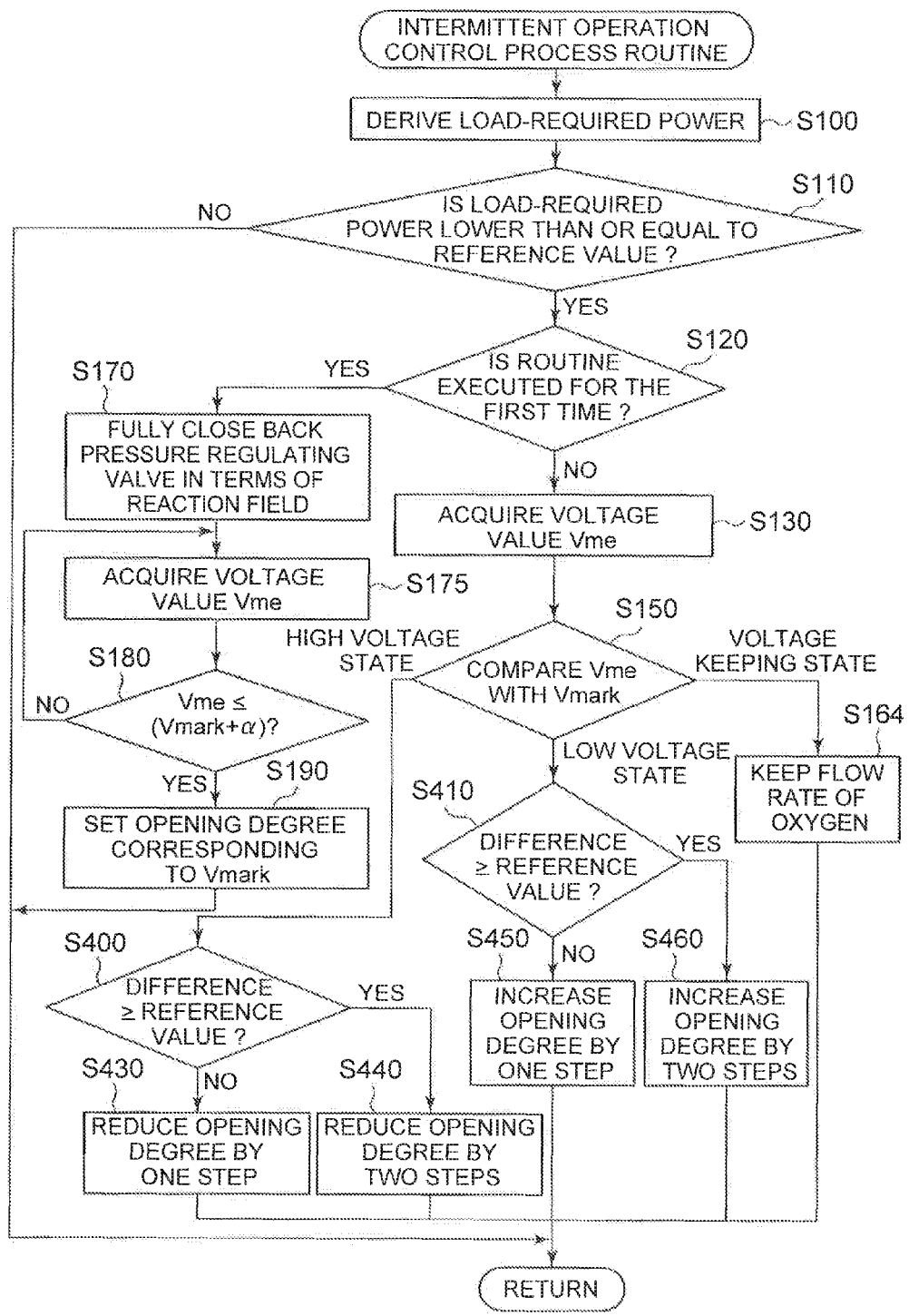
FIG. 8 is a flowchart that shows an intermittent operation control process routine according to some embodiments of the disclosure.

FIG. 8 is a flowchart that shows an intermittent operation control process routine that is executed by the CPU of the control unit 200 according to the third embodiment, instead of the intermittent operation control process routine shown in FIG. 4. In the routine, the processes other than the processes from step S150 are similar to those of the intermittent operation control process routine shown in FIG. 4, so like step numbers denote the common processes, and the detailed description thereof is omitted.

When it is determined in step S150 that the fuel cell 100 is in the above-described high voltage state as a result of comparison between the voltage value Vme and the target voltage Vmark, the CPU further determines whether the difference between the voltage value Vme and the target voltage Vmark is larger than or equal to a predetermined reference value (step S400). When the CPU determines that the difference is smaller than the reference value, the CPU outputs, to the back pressure regulating valve 143, a signal for reducing the opening degree of the back pressure regulating valve 143 by the amount of one step in the non-power generation state (step S430), and then ends the routine. When it is determined in step S400 that the difference is larger than or equal to the reference value, the CPU outputs, to the back pressure regulating valve 143, a signal for reducing the opening degree of the back pressure regulating valve 143 by the amount of two steps in the non-power generation state (step S440), and then ends the routine.

As a result of the comparison between the voltage value Vme and the target voltage Vmark in step S150, when it is determined that the fuel cell 100 is in the above-described low voltage state, the CPU further determines whether the difference between the voltage value Vme and the target voltage Vmark is larger than or equal to the predetermined reference value (step S410). When the CPU determines that the difference is smaller than the reference value, the CPU outputs, to the back pressure regulating valve 143, a signal for increasing the opening degree of the back pressure regulating valve 143 by the amount of one step in the non-power generation state (step S450), and then ends the routine. When it is determined in step S410 that the difference is larger than or equal to the reference value, the CPU outputs, to the back pressure regulating valve 143, a signal for increasing the opening degree of the back pressure regulating valve 143 by the amount of two steps in the non-power generation state (step S460), and then ends the routine.

As a result of the comparison between the voltage value Vme and the target voltage Vmark in step S150, when it is determined that the fuel cell 100 is in the voltage keeping state, the CPU keeps the amount of oxygen that is supplied to the cathode passage by keeping the current opening degree of the back pressure regulating valve 143 in the non-power generation state (step S164), and then ends the routine.

According to the third embodiment, when the opening degree of the back pressure regulating valve 143 (e.g., controlling the amount of oxygen supplied) is increased or reduced as a result of the high voltage state or the low voltage state, the degree of increase or reduction is increased as the difference between the voltage value Vme and the target voltage Vmark increases. Therefore, even when the difference between the voltage value Vme and the target voltage Vmark fluctuates, it is possible to quickly bring the open circuit voltage of the fuel cell 100 close to the target voltage Vmark. As one of causes of fluctuations in the difference between the voltage value Vme and the target voltage Vmark, for example, the amount of hydrogen that permeates through the electrolyte membrane fluctuates as a result of fluctuations of at least one that is selected from among the hydrogen pressure in the anode passage, the internal temperature of the fuel cell 100 and the internal humidity of the fuel cell 100, and the amount of oxygen for keeping the cell voltage in the above-described mathematical expression (1) fluctuates.

The reference value that is used in determinations of step S400 and step S410 may be, for example, determined in consideration of, for example, the amount of change in the rate of increase or reduction in the amount of oxygen supplied as a result of varying the degree to which the amount of oxygen supplied is increased or reduced. The reference value used may be varied or the same between step S400 and step S410. In FIG. 8, each of the operation for increasing the amount of oxygen supplied and the operation for reducing the amount of oxygen supplied in response to the difference between the voltage value Vme and the target voltage Vmark is changeable in two steps. Instead, it may be changeable in three steps or more. The unit in which the amount of oxygen supplied may be a combination other than a combination of the amount of one step of the stepping motor and the amount of two steps of the stepping motor.

In the first embodiment, when the intermittent operation mode is selected, control for bringing the voltage value Vme that is the OCV of the fuel cell 100 close to the set target voltage Vmark is continuously executed; however, it is possible to change the target voltage Vmark in response to a state of fluctuations in the voltage value Vme. Such a configuration will be described below as a fourth embodiment.

Figure 9:
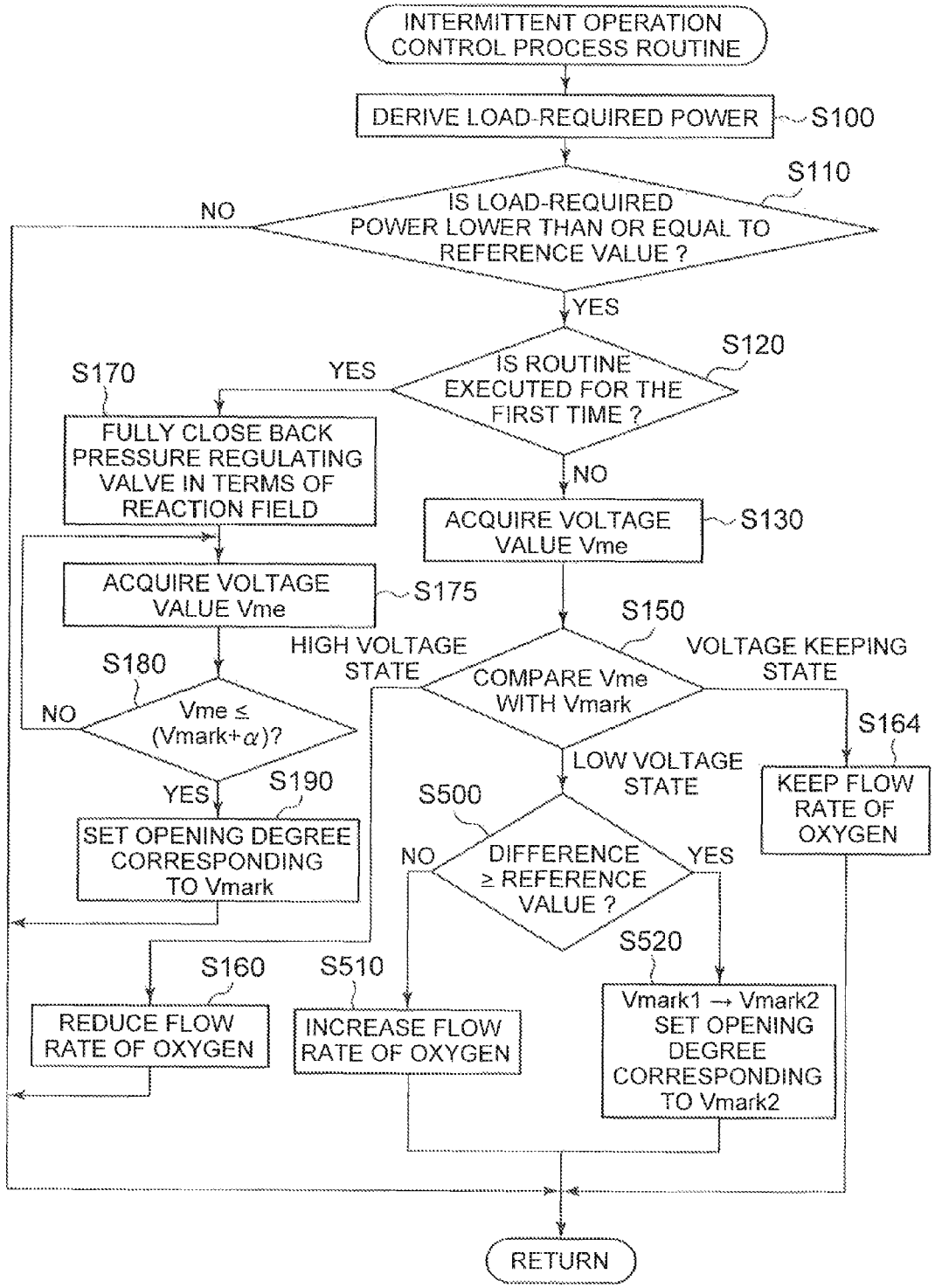
FIG. 9 is a flowchart that shows an intermittent operation control process routine according to some embodiments of the disclosure.

FIG. 9 is a flowchart that shows an intermittent operation control process routine that is executed by the CPU of the control unit 200 according to the fourth embodiment, instead of the intermittent operation control process routine shown in FIG. 4. In the routine, the processes other than the processes from step S150 are similar to those of the intermittent operation control process routine shown in FIG. 4, so like step numbers denote the common processes, and the detailed description thereof is omitted.

When it is determined in step S150 that the fuel cell 100 is in the above-described high voltage state as a result of comparison between the voltage value Vme and the target voltage Vmark, the CPU, as in the case of FIG. 4, reduces the flow rate of oxygen by reducing the opening degree of the back pressure regulating valve 143 in the non-power generation state (step S160), and then ends the routine. As a result of the comparison, when it is determined that the fuel cell 100 is in the voltage keeping state, the CPU, as in the case of FIG. 4, keeps the flow rate of oxygen by keeping the current opening degree of the back pressure regulating valve 143 in the non-power generation state (step S164), and then ends the routine.

As a result of the comparison in step S150, when it is determined that the fuel cell 100 is in the above-described low voltage state, the CPU determines whether the difference between the voltage value Vme and the target voltage Vmark is larger than or equal to the predetermined reference value (step S500). When the CPU determines that the difference is smaller than the reference value, the CPU, as in the case of step S162 of FIG. 4, increases the flow rate of oxygen by increasing the opening degree of the back pressure regulating valve 143 in the non-power generation state (step S510), and then ends the routine. When it is determined in step S500 that the difference is larger than or equal to the reference value, the CPU, in the non-power generation state, changes the target voltage Vmark from the target voltage Vmark1 set till then to the lower target voltage Vmark2, outputs a driving signal to the back pressure regulating valve 143 such that the opening degree of the back pressure regulating valve 143 becomes the opening degree stored in the memory in the control unit 200 in advance as the opening degree for achieving the target voltage Vmark2 (step S520), and then ends the routine.

In the fourth embodiment, the reference value that is used in determination of step S500 may be regarded as an allowable value according to the disclosure. The target voltage Vmark1 used as the target voltage Vmark until it is determined in step S500 that the difference is larger than or equal to the reference value may be regarded as the first target voltage according to the disclosure. The target voltage Vmark2 that is newly set in step S520 may be regarded as the second target voltage according to the disclosure.

According to the fourth embodiment, when it is difficult to keep the target voltage Vmark1 even when voltage keeping control for adjusting the opening degree of the back pressure regulating valve 143 is executed on the basis of the voltage value Vme, the target voltage Vmark is changed from the target voltage Vmark1 to the target voltage Vmark2 lower than the target voltage Vmark1. Therefore, it is possible to suppress occurrence of a high-voltage single cell to an undesired level due to variations in the OCV of each single cell.

A cause of making it difficult to keep the target voltage Vmark1 includes, for example, occurrence of variations in passage resistance in the cathode passage of each single cell. When the passage resistance varies, the voltage decreases because of insufficient oxygen in the cathode of part of the single cells, the average cell voltage may decrease in the fuel cell 100 as a whole. A cause of variations in the passage resistance in the cathode passage of each single cell includes, for example, production of liquid water near the cathode. This is because, when the intermittent operation mode is selected together with a stop of the power generation, the oxidation reaction of hydrogen that has permeated through the electrolyte membrane proceeds on the cathode, and water is produced by the reaction.

When the amount of oxygen supplied is increased in order to bring the open circuit voltage of the fuel cell 100 close to the target voltage Vmark1 at the time when it is difficult to keep the target voltage Vmark1 in this way, a larger amount of supplied oxygen flows through the passage having a small flow resistance, so there is a possibility that variations in cell voltage further increase. Therefore, when control for increasing the amount of oxygen supplied is continued while the target voltage is kept high, there is a high probability that an undesirably high-voltage cell arises. In the fourth embodiment, when it is difficult to keep the set target voltage Vmark1, the target voltage that is used in control is changed to the lower target voltage Vmark2. Therefore, it is possible to suppress occurrence of an excessively high-voltage single cell due to an increase in variations among the single cells with respect to a high average voltage.

Because reduction of the electrode catalyst of the cathode tends to proceed as a result of a decrease in the open circuit voltage of the fuel cell 100, when the once reduced voltage is increased, elution of the catalyst electrode tends to proceed in the cathode as described above. In the fourth embodiment, when the voltage value Vme has decreased by a certain amount or more, a re-increase in the OCV is suppressed by also reducing the target voltage Vmark, so it is possible to suppress degradation of the catalyst due to a re-increase in voltage.

The second target voltage Vmark2 that is newly set in step S520 may be higher than, lower than or equal to the voltage value Vme that is the current OCV detected in step S130. However, the second target voltage Vmark2 is desirably lower than the voltage value Vme detected in step S130 from the viewpoint of suppressing the frequency of a re-increase in the voltage of the fuel cell 100.

Even after the lower second target voltage Vmark2 has been newly set, when the voltage value Vme continues to decrease and the difference between the voltage value Vme and the second target voltage Vmark2 expands, the operation for setting the target voltage Vmark to a further lower value may be repeatedly executed. In this way, the target voltage Vmark that has changed to the lower value just needs to be reset when the load-required power exceeds a predetermined value and the intermittent operation mode is cancelled.

The fourth embodiment may be combined with the third embodiment. Specifically, when the voltage value Vme is lower than the target voltage Vmark and the difference between the target voltage Vmark and the voltage value Vme is smaller than or equal to the predetermined value, control for increasing the degree of increasing the opening degree of the back pressure regulating valve 143 just needs to be executed as the difference between the target voltage Vmark and the voltage value Vme increases (as discussed with regard to step S450 and step S460 of FIG. 8). When the voltage value Vme is lower than the target voltage Vmark and the difference between the target voltage Vmark and the voltage value Vme exceeds the predetermined value, control for changing the target voltage Vmark to a lower value just needs to be executed (as discussed with regard to step S520 of FIG. 9).

When the target voltage Vmark is changed from the target voltage Vmark1 set till then to the lower target voltage Vmark2 in step S520 in the fourth embodiment, not the opening degree of the back pressure regulating valve 143 is immediately changed so as to be the opening degree stored in the memory in the control unit 200 in advance as the opening degree for achieving the target voltage Vmark2 but the opening degree of the back pressure regulating valve 143 may be once fully closed. That is, as in the case of FIG. 6, in advance of changing the opening degree of the back pressure regulating valve 143 to the opening degree commensurate with the target voltage Vmark2 (step S330), until the voltage value Vme becomes lower than or equal to the sum of the second target voltage Vmark2 and β (step S320), the back pressure regulating valve 143 may be fully closed (step S300) to stop supply of oxygen. With the above configuration, it is possible to reduce variations in the open circuit voltage of each single cell, which occur while the first target voltage Vmark1 is used as the target voltage Vmark.

In the third embodiment, the amount of change in the flow rate of oxygen (e.g., the amount of change in the opening degree of the back pressure regulating valve 143) is changed in response to the difference between the voltage value Vme and the target voltage Vmark. In the fourth embodiment, the target voltage Vmark is changed in response to the difference between the voltage value Vme and the target voltage Vmark. In contrast, when a significant change in the voltage value Vme is predicted, the amount of increase or reduction in the opening degree of the back pressure regulating valve 143 may be changed in order to cancel a predicted change in the voltage value Vme before the voltage value Vme changes. Such a configuration will be described below as a fifth embodiment.

Figure 10:
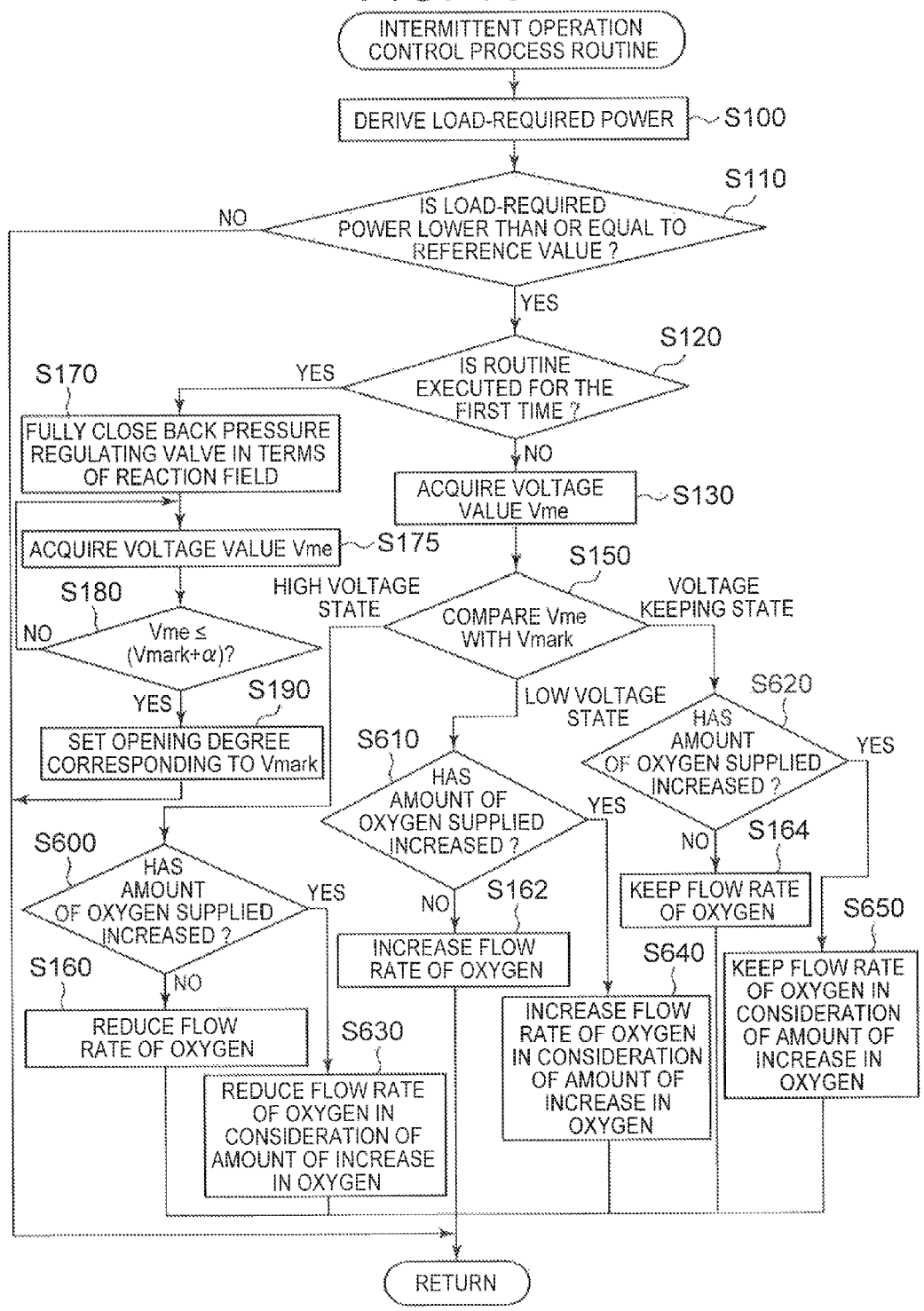
FIG. 10 is a flowchart that shows an intermittent operation control process routine according to some embodiments of the disclosure.

FIG. 10 is a flowchart that shows an intermittent operation control process routine that is executed by the CPU of the control unit 200 according to the fifth embodiment instead of the intermittent operation control process routine shown in FIG. 4. In the routine, the processes other than the processes from step S150 are similar to those of the intermittent operation control process routine shown in FIG. 4, so like step numbers denote the common processes, and the detailed description thereof is omitted.

When it is determined in step S150 that the fuel cell 100 is in the above-described high voltage state as a result of comparison between the voltage value Vme and the target voltage Vmark, the CPU determines whether an increase in the amount of oxygen that is supplied to the fuel cell 100 is predicted (e.g., whether the condition that the amount of oxygen supplied increases is satisfied) (step S600). When an increase in the amount of oxygen supplied is not predicted, the CPU executes the ordinary process of reducing the flow rate of oxygen that is supplied to the cathode passage by reducing the opening degree of the back pressure regulating valve 143 (step S160), and then ends the routine. When an increase in the amount of oxygen supplied is predicted in step S600, the CPU adjusts the opening degree of the back pressure regulating valve 143 such that the flow rate of oxygen is reduced by a desired amount in consideration of the influence of an increase in the amount of oxygen supplied (step S630), and then ends the routine.

As a result of the comparison between the voltage value Vme and the target voltage Vmark in step S150, when it is determined that the fuel cell 100 is in the above-described low voltage state, the CPU determines whether an increase in the amount of oxygen that is supplied to the fuel cell 100 is predicted (e.g., whether the condition that the amount of oxygen supplied increases is satisfied) (step S610). When an increase in the amount of oxygen supplied is not predicted, the CPU executes the ordinary process of increasing the flow rate of oxygen that is supplied to the cathode passage by increasing the opening degree of the back pressure regulating valve 143 (step S162), and then ends the routine. When an increase in the amount of oxygen supplied is predicted in step S610, the CPU adjusts the opening degree of the back pressure regulating valve 143 such that the flow rate of oxygen is increased by a desired amount in consideration of the influence of an increase in the amount of oxygen supplied (step S640), and then ends the routine.

As a result of the comparison between the voltage value Vme and the target voltage Vmark in step S150, when it is determined that the fuel cell 100 is in the voltage keeping state, the CPU determines whether an increase in the amount of oxygen that is supplied to the fuel cell 100 is predicted (e.g., whether the condition that the amount of oxygen supplied increases is satisfied) (step S620). When an increase in the amount of oxygen supplied is not predicted, the CPU executes the ordinary process of keeping the flow rate of oxygen that is supplied to the cathode passage by keeping the current opening degree of the back pressure regulating valve 143 (step S164), and then ends the routine. When an increase in the amount of oxygen supplied is predicted in step S620, the CPU adjusts the opening degree of the back pressure regulating valve 143 such that the flow rate of oxygen is kept in consideration of the influence of an increase in the amount of oxygen supplied (step S650), and then ends the routine.

The time when an increase in the amount of oxygen supplied is predicted includes, for example, the case where it is determined that it is the timing to release part of hydrogen flowing through the circulation passage 122, via the open-close valve 129 provided in the hydrogen release passage 123. As described above, when the intermittent operation mode is selected as well, an increase in the concentration of impurities in the anode passage is suppressed by opening the open-close valve 129 at predetermined timing. At the time of releasing hydrogen in the circulation passage 122 by opening the open-close valve 129, the concentration of hydrogen that is released from the fuel-cell vehicle 20 is reduced by diluting hydrogen by guiding hydrogen to be released, to the air release passage 142, as described above with regard to FIG. 1. Therefore, in the fifth embodiment, at the time of opening the open-close valve 129, the concentration of hydrogen to be released is sufficiently reduced by increasing the amount of air flowing through the air release passage 142 by increasing the driving amount of the compressor 130 at the same time. When the driving amount of the compressor 130 is increased in this way, because the state of the flow dividing valve 144 is fixed, oxygen that is supplied to the cathode passage becomes excessive when ordinary control is executed over the back pressure regulating valve 143.

In the fifth embodiment, when it is the timing at which the open-close valve 129 is opened, control for reducing the opening of the back pressure regulating valve 143 is added in advance of an increase in the amount of oxygen that is supplied to the fuel cell 100 as a result of an increase in the driving amount of the compressor 130. Thus, even when the driving amount of the compressor 130 increases, the amount of change in oxygen that is supplied to the fuel cell 100 is suppressed to a desired amount that is derived from the correlation between the voltage value Vme and Vmark by suppressing the influence of the amount of increase in the driving amount of the compressor 130. In the fifth embodiment, a certain value is determined in advance as the amount of increase in the driving amount of the compressor 130 at the time of opening the open-close valve 129. As described above, the state of the flow dividing valve 144 is fixed. Therefore, in the fifth embodiment, over all the range of the opening degree of the back pressure regulating valve 143, which can be taken before an increase in the driving amount of the compressor 130, when the driving amount of the compressor 130 is increased by a predetermined amount, the opening degree of the back pressure regulating valve 143 for increasing the amount of oxygen supplied by the amount of one step, the opening degree for reducing the amount of oxygen by the amount of one step and the opening degree for keeping the amount of oxygen supplied in ordinary control are empirically obtained in advance and stored as a map in the memory in the control unit 200. In step S630, step S640 and step S650, the CPU determines the driving amount of the back pressure regulating valve 143 by consulting the map on the basis of the current opening degree of the back pressure regulating valve 143.

A time during which the open-close valve 129 should be open is determined in advance. Therefore, after it is once determined that it is the timing to open the open-close valve 129, until the time to open the valve elapses, it is determined in step S600 or step S610 that the condition that an increase in the amount of oxygen supplied is predicted is satisfied.

With the above configuration, for the purpose different from voltage control over the fuel cell 100 or factors different from ordinary factors that the open circuit voltage of the fuel cell fluctuates, even when the amount of oxygen that is supplied to the fuel cell 100 can fluctuate, it is possible to suppress the fluctuations and stably control the OCV of the fuel cell 100 to the target voltage Vmark.

Control according to the fifth embodiment based on whether an increase in the amount of oxygen that is supplied to the fuel cell 100 is predicted may be applied to control according to the third embodiment shown in FIG. 8 or control according to the fourth embodiment shown in FIG. 9 instead of control according to the first embodiment shown in FIG. 4. In the fifth embodiment, the case where an increase in the amount of oxygen supplied is predicted includes the case where it is determined that the open-close valve 129 should be opened; however, another configuration may be employed. For example, when it is determined that liquid water stagnates at any portion in the passage of oxygen that is supplied to the fuel cell 100, the configuration that stagnation of liquid water is eliminated by temporarily increasing the driving amount of the compressor 130 may be employed, and a similar process may be executed at the time of temporarily increasing the driving amount of the compressor 130. Instead of the case where an increase in the amount of oxygen supplied is predicted, when a reduction in the amount of oxygen supplied is predicted, control may be changed (e.g., control for increasing the opening degree of the back pressure regulating valve 143 may be added). The case where a reduction in the amount of oxygen supplied is predicted includes, for example, the case where there occurs a malfunction in the compressor 130 and it is determined that the driving amount should be suppressed.

In the first to fifth embodiments, the opening degree of the back pressure regulating valve 143 is increased or reduced by the preset amount of change on the basis of the result of comparison between the voltage value Vme and the target voltage Vmark; however, another configuration may be employed. For example, when the voltage value Vme reaches a limit value determined as an upper limit value or a lower limit value, the situation that the voltage value Vme reaches the limit value may be suppressed by fully changing the opening degree of the back pressure regulating valve 143. Such a configuration will be described below as a sixth embodiment.

Figure 11:
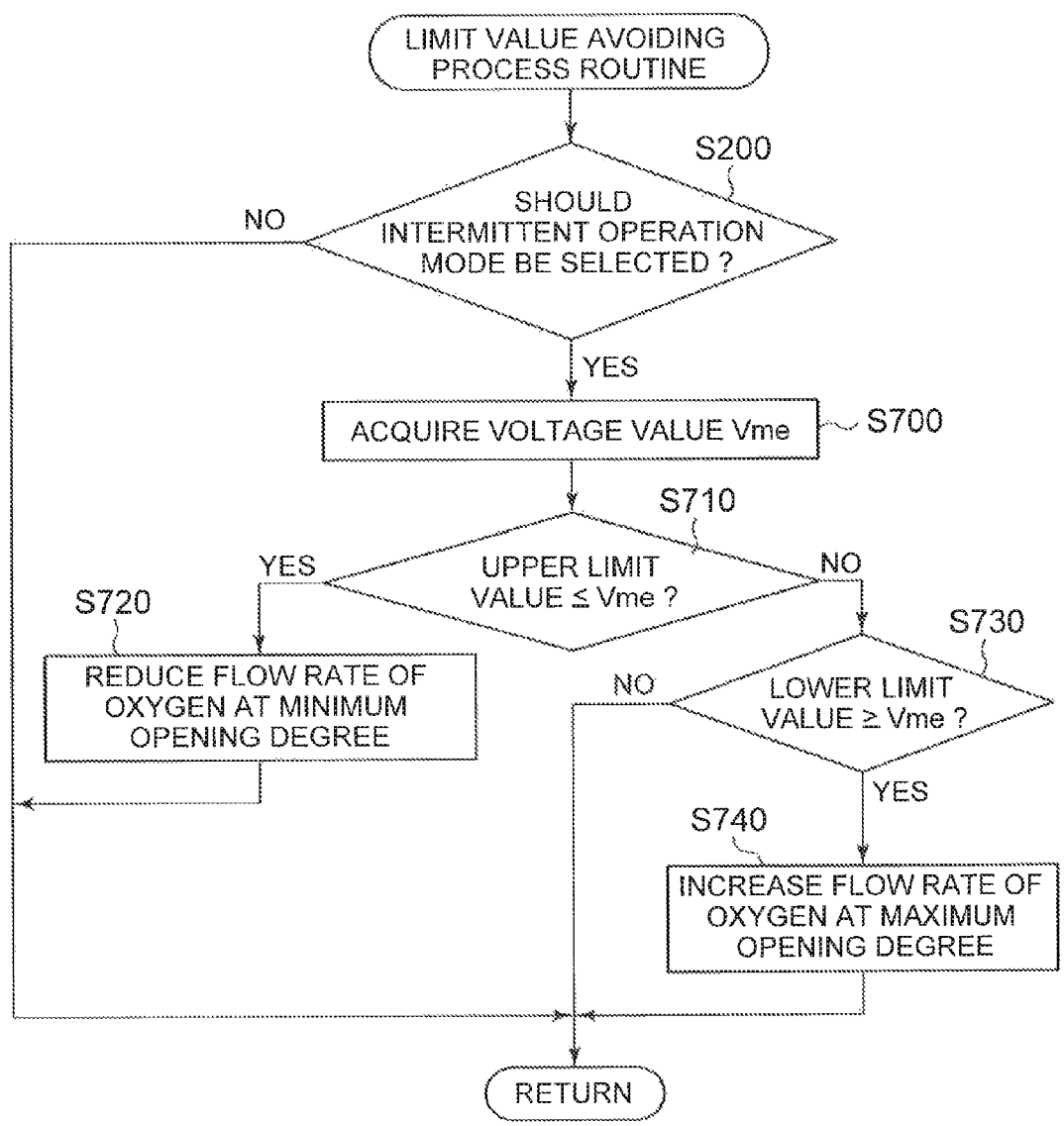
FIG. 11 is a flowchart that shows a limit value avoiding process routine according to some embodiments of the disclosure.

FIG. 11 is a flowchart that shows a limit value avoiding process routine that is executed in the fuel-cell vehicle 20 according to the sixth embodiment. The routine is repeatedly executed during operation of the power supply system 30 in parallel with the intermittent operation control process routine shown in FIG. 4 until a command to stop the system is input by the user after the power supply system 30 is started up.

When the routine is executed, the CPU determines whether it is in the state where the intermittent operation mode should be selected (step S200). The process of step S200 is the same as the processes of step S100 and step S110 in FIG. 4. When it is determined in step S200 that it is not in the state where the intermittent operation mode should be selected (e.g., the load-required power exceeds the reference value), the CPU ends the routine.

When it is determined in step S200 that it is in the state where the intermittent operation mode should be selected (e.g., the load-required power is lower than or equal to the reference value), the CPU acquires the voltage value Vme, which is the current OCV, from the voltage sensor 102 (step S700). The process of step S700 is similar to the process of step S130 in FIG. 4.

When the voltage value Vme is acquired, the CPU determines whether the voltage value Vme is higher than or equal to the upper limit value (step S710). The upper limit value that is used in determination of step S710 is a value determined in advance as a value that indicates that the cathode is in the high potential state (e.g., the state where the electrode catalyst extremely tends to elute) to be avoided. The upper limit value may be, for example, set to 0.9 V.

When it is determined in step S710 that the voltage value Vme is higher than or equal to the upper limit value, the CPU reduces the amount of oxygen supplied by outputting a driving signal to the back pressure regulating valve 143 such that the opening degree of the back pressure regulating valve 143 becomes minimum (step S720), and then ends the routine. The time when the opening degree of the back pressure regulating valve 143 becomes minimum just needs to be the time when the opening degree of the back pressure regulating valve 143 is the opening degree at which the effective sectional area of the passage in the back pressure regulating valve 143 becomes substantially zero and does not need to be the mechanically fully closed state of the back pressure regulating valve 143. By temporarily substantially interrupting supply of oxygen in this way, the OCV of the fuel cell 100 quickly decreases.

When it is determined in step S710 that the voltage value Vme is lower than the upper limit value, the CPU determines whether the voltage value Vme is lower than or equal to the lower limit value (step S730). The lower limit value that is used in determination of step S730 is a value determined in advance as a value that indicates that the cathode is in the low potential state (e.g., the state where the degree to which the electrode catalyst is reduced is extremely high) to be avoided. The lower limit value may be, for example, set to 0.1 V.

When it is determined in step S730 that the voltage value Vme is lower than or equal to the lower limit value, the CPU increases the amount of oxygen supplied by outputting a driving signal to the back pressure regulating valve 143 such that the opening degree of the back pressure regulating valve 143 becomes maximum (step S740), and then ends the routine. The maximum opening degree in the back pressure regulating valve 143 just needs to be set in advance for each target voltage Vmark as the opening degree at which it is possible to supply the amount of oxygen for achieving the currently set target voltage Vmark even when the amount of hydrogen that permeates through the electrolyte membrane becomes maximum, and does not need to be the mechanical fully open state of the back pressure regulating valve 143. By temporarily steeply increasing supply of oxygen in this way, the OCV of the fuel cell 100 quickly increases.

In the sixth embodiment, the operation associated with an increase or reduction in the amount of oxygen supplied in step S720 or step S730 is executed by interrupt processing in preference to an increase or reduction in the amount of oxygen supplied based on FIG. 4. Therefore, when the voltage value Vme has reached the upper limit value or the lower limit value, it is possible to avoid an inconvenience due to the situation that the voltage value Vme reaches the upper limit value or the lower limit value by bringing the voltage value Vme away from the upper limit value or the lower limit value. When it is determined in step S730 that the voltage value Vme exceeds the lower limit value, the CPU ends the routine, and executes ordinary control over the amount of oxygen supplied based on FIG. 4.

With the above configuration, when the open circuit voltage of the fuel cell has reached an undesired limit value, it is possible to quickly bring the open circuit voltage of the fuel cell away from the limit value.

Control based on FIG. 11 for avoiding the limit value (e.g., the upper limit value or the lower limit value) of the fuel cell 100 in the sixth embodiment may be executed in parallel with the process routine according to the third embodiment shown in FIG. 8 or the process routine according to the fourth embodiment shown in FIG. 9 instead of the process routine according to the first embodiment shown in FIG. 4, and may be executed in preference to the operation to change the amount of oxygen supplied based on the above-described control process routine.

In each of the above-described embodiments, when the intermittent operation mode is selected, the power generation of the fuel cell 100 is stopped, and the amount of oxygen supplied is increased or reduced on the basis of the result of comparison between the OCV of the fuel cell 100 and the target voltage Vmark; however, another configuration may be employed. For example, when the OCV of the fuel cell 100 exceeds the target voltage Vmark, an increase in the voltage of the fuel cell 100 may be suppressed not by reducing the amount of oxygen supplied in the power generation stopped state but by allowing the fuel cell 100 to minutely generate electric power. Such a configuration will be described below as a seventh embodiment.

FIG. 12 is a flowchart that shows an intermittent operation control process routine that is executed by the CPU of the control unit 200 according to the seventh embodiment, instead of the intermittent operation control process routine shown in FIG. 4. In the routine, the processes other than the processes from step S150 are similar to those of the intermittent operation control process routine shown in FIG. 4, so like step numbers denote the common processes, and the detailed description thereof is omitted.

When it is determined in step S150 that the fuel cell 100 is in the above-described low voltage state as a result of comparison between the voltage value Vme and the target voltage Vmark, the CPU, as in the case of FIG. 4, increases the flow rate of oxygen by increasing the opening degree of the back pressure regulating valve 143 in the non-power generation state (step S162), and then ends the routine. As a result of the comparison, when it is determined that the fuel cell 100 is in the voltage keeping state, the CPU, as in the case of FIG. 4, keeps the flow rate of oxygen by keeping the current opening degree of the back pressure regulating valve 143 in the non-power generation state (step S164), and then ends the routine.

As a result of the comparison in step S150, when it is determined that the fuel cell 100 is in the above-described high voltage state, the CPU executes power generation control over the fuel cell 100 such that the output voltage of the fuel cell 100 becomes the target voltage Vmark (step S800), and then ends the routine. When the intermittent operation mode is selected, the amount of oxygen supplied is smaller than that when the normal operation mode is selected. Therefore, when the output voltage of the fuel cell 100 is set to the target voltage Vmark at the time when the intermittent operation mode is selected, the amount of electric power generated is smaller than that when the output voltage is set to the target voltage Vmark at the time when the normal operation mode is selected.

When minute power generation for adjusting the output voltage of the fuel cell 100 to the target voltage Vmark is once started in step S800, the output voltage of the fuel cell 100 during the power generation is acquired at the time when the intermittent operation control process routine shown in FIG. 12 is repeated thereafter. At this time, because the output voltage is set to the target voltage Vmark, it is determined in step S150 that the fuel cell 100 is in the voltage keeping state. In step S164, the minute power generation is kept while the output voltage is set to the target voltage Vmark.

With the above-described configuration, at least until the fuel cell 100 becomes the high voltage state where the OCV is higher than Vmark, control is executed in the intermittent operation mode in which the power generation of the fuel cell 100 is stopped. Therefore, it is possible to suppress the amount of electric power generated from the fuel cell 100 in the low load state, with the result that it is possible to suppress a decrease in the energy efficiency of the power supply system 30. Control over the amount of oxygen that is supplied in the non-power generation state or the minute power generation is carried out such that the voltage of the fuel cell 100 becomes the target voltage Vmark, so it is possible to suppress fluctuations in the voltage of the fuel cell 100, and it is possible to improve the durability of the fuel cell 100.

In each of the above-described embodiments, the opening degree of the back pressure regulating valve 143, which is set in step S190 for achieving the target voltage Vmark, is determined in advance for each target voltage Vmark and stored in the memory of the control unit 200. After voltage keeping control is started, by adjusting the opening degree of the back pressure regulating valve 143 on the basis of the difference between the voltage value Vme and the target voltage Vmark, the amount of oxygen for keeping the cell voltage, shown in the mathematical expression (1), is supplied to the fuel cell 100 eventually. In contrast, in a first alternative embodiment, the amount of oxygen to be supplied may be determined by calculating the amount of oxygen for keeping the cell voltage, shown in the mathematical expression (1), on the basis of various parameters. In this case, for example, the amount of permeated hydrogen is obtained by detecting the hydrogen partial pressure in the anode passage (e.g., the pressure and the concentration of hydrogen in the anode passage), the temperature in the fuel cell 100 and the humidity in the fuel cell 100, and the amount of oxygen consumed by the permeated hydrogen just needs to be obtained. The amount of oxygen for keeping the cell voltage may be obtained on the basis of the mathematical expression (1) as the sum of the amount of oxygen that is required to generate electromotive force and the amount of oxygen consumed by the permeated hydrogen, and the back pressure regulating valve 143 may be set at the opening degree at which it is possible to supply such amount of oxygen for keeping the cell voltage.

At this time, the pressure in the anode passage can be acquired on the basis of the detected value of the pressure sensor 128 provided in the circulation passage 122. The concentration of hydrogen in the anode passage can be acquired by providing a hydrogen concentration sensor in the circulation passage 122. The temperature in the fuel cell 100 may be, for example, detected by providing a temperature sensor inside the fuel cell 100, and may be estimated from the temperature of refrigerant that is drained from the fuel cell 100. The humidity in the fuel cell 100 can be, for example, detected by providing a humidity sensor in the cathode passage. The correlation between the amount of oxygen to be supplied to the fuel cell 100 and the opening degree of the back pressure regulating valve 143 just needs to be studied and stored in advance as a map.

In each of the above-described embodiments, the voltage value Vme that is acquired in step S130 or step S175 is set to the average cell voltage obtained by dividing the OCV of the overall stack by the number of the cells. In contrast, another configuration may be employed in a second alternative embodiment. For example, the voltage of each of the single cells that constitute the fuel cell 100 may be measured individually, a minimum cell voltage may be used as the voltage value Vme or a maximum cell voltage may be used as the voltage value Vme. When the minimum cell voltage is used, it is advantageous from the viewpoint of suppressing an excessive reduction in the electrode catalyst of the cathode as a result of an excessive decrease in the voltage of each single cell. When the maximum cell voltage is used, it is advantageous from the viewpoint of suppressing excessive elution of the electrode catalyst of the cathode as a result of an excessive increase in the voltage of each single cell.

In each of the above-described embodiments, the back pressure regulating valve 143 provided in the second air passage 145 is used as the flow regulating valve that is provided in the oxygen supply passage in order to change the amount of oxygen that is supplied to the cathode. In contrast, another configuration may be employed in a third alternative embodiment. Instead of the back pressure regulating valve 143 that is a throttle valve provided in the passage (e.g., a downstream-side passage) through which oxygen emitted from the fuel cell 100 flows, the amount of oxygen supplied may be adjusted by controlling the opening degree of a throttle valve provided in the passage (e.g., an upstream-side passage) for supplying oxygen to the fuel cell 100. Alternatively, the amount of oxygen supplied may be adjusted by controlling the opening degrees of throttle valves respectively provided in the downstream-side passage and the upstream-side passage. When the flow regulating valve that is able to adjust the amount of oxygen that is supplied to the cathode is provided, control similar to that of each of the above-described embodiments is possible.

In the above-described embodiments, when the intermittent operation mode is selected, by changing the opening degree of the back pressure regulating valve 143 while the driving amount of the compressor 130 and the state of opening of the flow dividing valve 144 are fixed, the amount of oxygen supplied is controlled such that the OCV of the fuel cell 100 becomes the target voltage Vmark; however, another configuration may be employed. For example, the amount of oxygen supplied may be controlled by changing at least one that is selected from among the driving amount of the compressor 130 (e.g., the amount of oxygen that is introduced by an oxygen introducing unit), the state of opening of the flow dividing valve 144 and the opening degree of the back pressure regulating valve 143 (e.g., the opening degree of the flow regulating valve). Alternatively, without providing the bypass passage (third air passage 146) in the oxygen supply passage, a compressor that is able to adjust the amount of oxygen supplied to a desired flow rate when the intermittent operation mode is selected may be provided instead of the compressor 130 or in addition to the compressor 130, and the amount of oxygen supplied may be adjusted through control over the driving amount of the compressor. With such a configuration as well, without measuring the amount of oxygen supplied, it is possible to adjust the voltage (e.g., cathode potential) of the fuel cell 100 to a desired voltage that avoids an undesired high potential in the power generation stopped state by adjusting the amount of oxygen supplied on the basis of the voltage value Vme.

In each of the above-described embodiments, at the time of stopping the power generation of the fuel cell 100 when the intermittent operation mode is selected, electrical connection between the fuel cell 100 and the load is interrupted by the diode provided in the DC-DC converter 104. In contrast, another configuration may be employed in a fourth alternative embodiment. For example, a switch that physically interrupts electrical connection between the fuel cell 100 and the load may be provided in the wiring 178 as the load interruption unit.

The present disclosure is not limited to the above-described embodiments and alternative embodiments. For example, the technical features in the embodiments and alternative embodiments of the disclosure may be replaced or combined as needed.

What is claimed is:

1. A voltage control method for a fuel cell in a power supply system including the fuel cell configured to supply an electric power to a load, the voltage control method comprising:
    interrupting an electrical connection between the fuel cell and the load when the load is in a low load state where the electric power required by the load is less than or equal to a predetermined reference value;
    supplying oxygen to the fuel cell based on a preset condition when the electrical connection between the fuel cell and the load is interrupted, the preset condition being a condition for supplying the fuel cell with oxygen required to adjust an open circuit voltage of the fuel cell to a predetermined target voltage;
    detecting the open circuit voltage of the fuel cell after oxygen is supplied to the fuel cell based on the preset condition;
    in a first voltage state where the detected open circuit voltage is higher than the target voltage by a first value or larger, reducing an amount of oxygen supplied to the fuel cell;
    in a second voltage state where the detected open circuit voltage is lower than the target voltage by a second value or larger, increasing the amount of oxygen supplied to the fuel cell; and
    in a voltage keeping state where the detected open circuit voltage is lower than a sum of the target voltage and the first value and higher than a value obtained by subtracting the second value from the target voltage, keeping the amount of oxygen supplied to the fuel cell.

2. The voltage control method according to claim 1, further comprising:
    determining, in the low load state, whether a first state or a second state applies, the first state being a state where there is a higher probability that the load quickly requires the electric power than a probability that the load quickly requires the electric power in the second state;
    using a predetermined first target voltage as the target voltage when it is determined that the first state applies; and
    using a second target voltage as the target voltage when it is determined that the second state applies, the second target voltage being lower than the first target voltage.

3. The voltage control method according to claim 1, further comprising:
    using a first target voltage as the target voltage when a time elapsed after oxygen is supplied to the fuel cell based on the preset condition in the low load state is shorter than a preset reference time; and
    changing the target voltage from the first target voltage to a second target voltage lower than the first target voltage when the preset reference time has elapsed after oxygen is supplied to the fuel cell based on the preset condition.

4. The voltage control method according to claim 1, further comprising:
    determining, in the low load state, whether a shift position is a predetermined drive position or a predetermined non-drive position;
    using a predetermined first target voltage as the target voltage when the shift position is determined to be the predetermined drive position; and
    using a second target voltage as the target voltage when the shift position is determined to be the predetermined non-drive position, the second target voltage being lower than the first target voltage.

5. The voltage control method according to claim 4, further comprising:
    using the first target voltage as the target voltage when a time elapsed after oxygen is supplied to the fuel cell based on the preset condition is shorter than a preset reference time and when the shift position is determined to be the predetermined drive position; and
    changing the target voltage from the first target voltage to the second target voltage when the preset reference time has elapsed after oxygen is supplied to the fuel cell based on the preset condition and when the shift position is determined to be the predetermined drive position.

6. The voltage control method according to claim 1, further comprising:
    determining, in the low load state, whether a vehicle including the fuel cell is in a first state or a second state, the load having a higher probability of requiring a predetermined responsiveness of the electric power in the first state than in the second state, the predetermined responsiveness being higher than or equal to a predetermined level;
    using a predetermined first target voltage as the target voltage when the vehicle is in the first state; and
    using a second target voltage as the target voltage when the vehicle is in the second state, the second target voltage being lower than the first target voltage.

7. The voltage control method according to claim 1, further comprising:
    changing the target voltage from a first target voltage to a second target voltage lower than the first target voltage when the open circuit voltage of the fuel cell decreases, after oxygen is supplied to the fuel cell based on the preset condition in the low load state, by a preset allowable value or larger with respect to the first target voltage set as the target voltage.

8. The voltage control method according to claim 2, further comprising
    temporarily stopping supply of oxygen to the fuel cell before oxygen is supplied to the fuel cell after a target value of the open circuit voltage of the fuel cell is changed from the first target voltage to the second target voltage.

9. A voltage control method for a fuel cell in a power supply system including the fuel cell configured to supply an electric power to a load, the voltage control method comprising:
supplying oxygen to the fuel cell based on a preset condition in a low load state where an electric power required by the load is less than or equal to a predetermined reference value, the preset condition being a condition for supplying the fuel cell with oxygen required to adjust a voltage of the fuel cell to a predetermined target voltage;
detecting the voltage of the fuel cell after oxygen is supplied to the fuel cell based on the preset condition;
causing the fuel cell to generate an electric power by setting an output voltage to the target voltage in a first voltage state where the detected voltage is higher than the target voltage by a first value or larger;
in a second voltage state where the detected voltage is lower than the target voltage by a second value or larger, increasing an amount of oxygen supplied to the fuel cell in a state where electrical connection between the fuel cell and the load is interrupted; and
keeping the amount of oxygen supplied to the fuel cell in a voltage keeping state where the detected voltage is lower than a sum of the target voltage and the first value and is higher than a value obtained by subtracting the second value from the target voltage.

10. A power supply system comprising:
a fuel cell configured to supply an electric power to a load;
an oxygen supply device configured to supply oxygen to a cathode of the fuel cell;
an oxygen amount regulator configured to regulate an amount of oxygen supplied to the cathode by the oxygen supply device;
a load interrupter configured to interrupt electrical connection between the fuel cell and the load in a low load state where an electric power required by the load is lower than or equal to a predetermined reference value; and
a voltage sensor configured to detect an open circuit voltage of the fuel cell,
wherein the oxygen amount regulator is further configured to drive the oxygen supply device in accordance with a preset condition in the low load state, the preset condition being a condition for supplying the fuel cell with oxygen required to adjust the open circuit voltage of the fuel cell to a predetermined target voltage,
the oxygen amount regulator is further configured to drive, after the oxygen supply device is driven, the oxygen supply device in a first voltage state to decrease the amount of oxygen supplied to the fuel cell, the first voltage state being a state where the detected open circuit voltage is higher than the target voltage by a first value or larger, and
the oxygen amount regulator is further configured to drive, after the oxygen supply device is driven, the oxygen supply device in a second voltage state to increase the amount of oxygen supplied to the fuel cell, the second voltage state being a state where the detected open circuit voltage is lower than the target voltage by a second value or larger.

11. The power supply system according to claim 10, wherein
the oxygen supply device includes an oxygen supply passage, an oxygen introducing device, a bypass passage, a flow dividing valve, and a flow regulating valve, the oxygen supply passage is a passage connected to the cathode,
the oxygen introducing device is configured to introduce oxygen into the oxygen supply passage,
the bypass passage branches off from the oxygen supply passage and is configured to guide oxygen supplied from the oxygen introducing device without allowing the oxygen to pass through the cathode,
the flow dividing valve is provided at a position at which the bypass passage branches off from the oxygen supply passage, and is configured to change a proportion of distribution of oxygen distributed between the oxygen supply passage and the bypass passage depending on a state of opening of the flow dividing valve,
the flow regulating valve is provided in the oxygen supply passage, and is configured to change the amount of oxygen supplied to the cathode, and
the oxygen amount regulator is configured to adjust the amount of oxygen supplied to the cathode by changing at least one of an amount of oxygen introduced by the oxygen introducing device, the state of opening of the flow dividing valve, or an opening degree of the flow regulating valve.

12. The power supply system according to claim 11, wherein
the oxygen amount regulator is further configured to adjust the amount of oxygen supplied to the cathode by changing the opening degree of the flow regulating valve in a state where the amount of oxygen introduced by the oxygen introducing device and the state of opening of the flow dividing valve are fixed.

13. A power supply system comprising:
a fuel cell configured to supply an electric power to a load;
an oxygen supply device configured to supply oxygen to a cathode of the fuel cell;
at least one electronic control unit configured to adjust an amount of oxygen supplied by the oxygen supply device to the cathode and to control a state of output of the fuel cell;
a load interrupter configured to interrupt electrical connection between the fuel cell and the load; and
a voltage sensor configured to detect a voltage of the fuel cell,
wherein the electronic control unit is further configured to drive the oxygen supply device in accordance with a preset condition in a low load state, the preset condition being a condition for supplying the fuel cell with oxygen required to adjust the voltage of the fuel cell to a predetermined target voltage,
the electronic control unit is further configured to drive the oxygen supply device to increase the amount of oxygen, which is supplied to the cathode, after the oxygen supply device is driven in accordance with the preset condition, in a second voltage state, and in a state where the load interrupter interrupts the electrical connection between the fuel cell and the load, the second voltage state being a state where the detected voltage is lower than the target voltage by a second value or larger, and
the electronic control unit is configured to control the state of output of the fuel cell to change an output voltage of the fuel cell to the target voltage after the electronic control unit drives the oxygen supply device in accordance with the preset condition, and in a first voltage state where the detected voltage is higher than the target voltage by a first value or larger.

* * * * *

UNITED STATES PATENT AND TRADEMARK OFFICE
CERTIFICATE OF CORRECTION

PATENT NO.         : 9,768,631 B2
APPLICATION NO.    : 14/933492
DATED              : September 19, 2017
INVENTOR(S)        : Tomio Yamanaka et al.

It is certified that error appears in the above-identified patent and that said Letters Patent is hereby corrected as shown below:

On the Title Page

Item no. (73), please correct the name of the Assignee from "Toyota Jidhosha Kabushiki Kaisha" to --Toyota Jidosha Kabushiki Kaisha--.

Signed and Sealed this
Twentieth Day of February, 2018

Andrei Iancu
*Director of the United States Patent and Trademark Office*